United States Patent [19]

Kunimoto et al.

[11] Patent Number: 5,214,642

[45] Date of Patent: May 25, 1993

[54] ATM SWITCHING SYSTEM AND ADAPTATION PROCESSING APPARATUS

[75] Inventors: Masao Kunimoto, Yokohama; Jiro Kashio, Kawasaki; Kenji Kawakita; Shinobu Gohara, both of Yokohama; Shinichi Iwaki, Kamakura; Hiroyuki Ichikawa, Hino, all of Japan

[73] Assignees: Hitachi, Ltd.; Nippon Telegraph and Telephone Corporation, Tokyo, Japan

[21] Appl. No.: 645,041

[22] Filed: Jan. 23, 1991

Related U.S. Application Data

[63] Continuation-in-part of Ser. No. 397,048, Aug. 21, 1989, Pat. No. 5,101,404, which is a continuation-in-part of Ser. No. 313,601, Feb. 21, 1989, Pat. No. 5,175,818.

[30] Foreign Application Priority Data

Jan. 24, 1990 [JP] Japan .................................. 2-12541
Aug. 24, 1990 [JP] Japan .................................. 2-221351

[51] Int. Cl.$^5$ .......................... H04J 3/16; H04Q 11/04
[52] U.S. Cl. ........................................ 370/82; 370/60; 370/79; 370/94.1
[58] Field of Search .................... 370/58.1, 58.2, 58.3, 370/60, 60.1, 61, 79, 82, 83, 94.1, 99

[56] References Cited

U.S. PATENT DOCUMENTS

| | | | |
|---|---|---|---|
| 4,910,731 | 3/1990 | Sakurai et al. | 370/60 |
| 4,956,839 | 9/1990 | Torii et al. | 370/60 |
| 5,007,045 | 4/1991 | Tsuzuki | 370/94.1 |
| 5,062,106 | 10/1991 | Yamazaki et al. | 370/94.1 |
| 5,084,867 | 1/1992 | Tachibana et al. | 370/60 |
| 5,099,475 | 3/1992 | Kozaki et al. | 370/60 |
| 5,101,404 | 3/1992 | Kunimoto et al. | 370/60 |

OTHER PUBLICATIONS

CCITT, The International Telegraph and Telephone Consulative Committee, Blue Book, vol. III, "Integrated Services Digital Network (ISDN) General Structure and Service Capabilities", Recommendations 1.110–1.257, IXTH Plenary Assembly, Melbourne, Nov. 14–25, 1988.

Hiroyuki Ichikawa et al., "A Study on Cell Assembling and Disassembling Functions in ATM Networks", NTT Communication Switching Laboratories, National Convention of the Institute of Electronics, Information and Communication Engineers of Japan, Autumn 1989, Paper B-168.

Toshikazu Suzuki et al., "A Study on ATM Adaptation Layer Functions", NTT Communication Switching Laboratories, Institute of Electronics, Information and Communication Engineers of Japan, Technical Study Report SSE 89-105.

Masao Kunimoto et al., "A Study of Implementation for ATM Protocol", Systems Development Laboratory, Totsuka Works, Hitachi, Ltd., Institute of Electronics, Information and Communication Engineering of Japan, Technical Study Report SSE 88-166.

(List continued on next page.)

Primary Examiner—Douglas W. Olms
Assistant Examiner—Alpus H. Hsu
Attorney, Agent, or Firm—Fay, Sharpe, Beall, Fagan, Minnich & McKee

[57] ABSTRACT

An adaptation processing apparatus for assembling received data units of a fixed length to provide variable length data units and transmitting the variable length data units to a plurality of variable length data unit processors while assembling variable length data units received from said plurality of the variable length data unit processors to provide fixed length data units for transmission thereof. An ATM switching system includes the adaptation processing apparatus, a signal processing unit including the plurality of variable length data unit processors mentioned above, and first-in first-out mechanisms for the variable length data units provided in the adaptation processing apparatus in association with every one of the plural variable length data unit processors.

22 Claims, 18 Drawing Sheets

OTHER PUBLICATIONS

Shirou Tanabe et al., "System Configuration of ATM Switching", Central Research Laboratory, Totsuka Works, System Development Laboratory, Hitachi, Ltd., Institute of Electronics, Information and Communication Engineers of Japan, Technical Study Report SSE 89-53.

Yasuharu Kohj et al., "A Study on ATM Signalling Method Which Takes Account of Meta-Signalling Procedure", Totsuka Works, Hitachi, Ltd., National Convention of the Institute of Electronics, Information and Communication Engineers of Japan, Autumn 1989, p. B-169.

Noboru Endo et al., "A Memory Switch Architecture for ATM Switching Network", Institute of Electronics, Information and Communication Engineering of Japan, Technical Report SSE 88-56, pp. 37-42. (Provided in Japanese).

ATM SWITCHING SYSTEM AND ADAPTATION PROCESSING APPARATUS

This application is a continuation-in-part application of U.S. Ser. No. 07/397,048, filed Aug. 21, 1989, now U.S. Pat. No. 5,101,404, which application is a continuation-in-part application of U.S. Ser. No. 07/313,601, filed Feb. 21, 1989, now U.S. Pat. No. 5,175,818.

BACKGROUND OF THE INVENTION

The present invention relates generally to a packet switching system and an adaptation processing apparatus therefor. More particularly, the invention is concerned with an ATM (Asynchronous Transfer Mode) switch for exchanging or switching packets, each of a fixed length, and an adaptation processing apparatus suited profitably for use in combination with the ATM switch.

At present, studies of a broad band ISDN (Integrated Services Digital Network) are in progress as the next generation ISDN under the presidency of the CCITT (International Telegraph and Telephone Consultative Committee). The broad band ISDN is intended to provide communication services at a transmission rate, for example, of 150 M bits/sec. According to the CCITT Recommendations I. 121 (so-called blue book), the ATM (Asynchronous Transfer Mode) switching system is mentioned as promising means for realizing the broad band ISDN mentioned above.

In the ISDN, there are made available two types of channels, i.e. an information channel (B- or H-channel) for transferring user's information and a signal channel (D-channel) for transferring control signals for setting up communication paths or routes.

In the ATM switching system, all the data of the signal and information channels are transmitted and received in the form of fixed-length packets referred to as "cells". By way of example, let's assume that an ATM subscriber's terminal transmits a frame (signal frame) 50 of the signal channel having a format illustrated in FIG. 22A of the accompanying drawings. In that case, the signal frame 50 is once disassembled into cells 51A to 51N each of a fixed length (this processing is referred to as the segmentation processing), whereon the cells are sent out onto the subscriber's line. At the ATM switch, the signal 50 is reconstituted from the cells 51A to 51N as received (this processing is referred to as the reassembling processing), which is then followed by execution of the intrinsic signal processing. On the contrary, when the signal frame is transmitted to an ATM subscriber's terminal from the ATM switch, the segmentation processing is executed at the ATM switch while the reassembling processing is performed at the subscriber's terminal. Similarly, in the case of transmission/reception between the ATM switches, the regeneration processing is performed by the sending switch with the reassembling processing being executed at the receiving switch. These segmentation/reassembly processings are defined as the functions of an adaptation layer ranking lower than the layer 2 according to the CCITT recommendations I. 121 (blue book). In the following description, the processing apparatus of the adaptation layer for executing processings, including the segmentation/reassembling processings, is referred to as "ADP processing part or apparatus".

Schemes for realizing or implementing the ADP processing apparatus are known. For example, in the Paper B-168 entitled "A Study on Cell Assembling and Disassembling Functions in ATM Networks" published in the National Convention of the Institute of Electronics, Information Communication Engineers of Japan held in Autumn, 1989 and the Technical Study Report SSE 89-105 entitled "A Study of ATM Adaptation Layer Functions" published by the abovementioned Institute are known disclosed systems.

SUMMARY OF THE INVENTION

The prior art systems, however, suffer from a problem in that the ADP processing can not be simultaneously executed for a plurality of high level layers (layers 2). Further, in the prior art ATM switching system, it is known that a "line-common posterior (downstream) installation scheme" is preferred for installation of the signal ADP processing apparatus in the ATM switch, which scheme is characterized in that the adaptation layer processings for a plurality of lines are realized by one and the same signal ADP processing apparatus by collecting/distributing the cells of signal channels of a plurality of lines by using an ATM switch, as is shown in the table 3 contained in the Technical Study Report SSE 88-166 published by the Institute of Electronics, Information and Communication Engineers of Japan, entitled "A study of Implementation at ATM protocol". However, attempt for applying the prior art scheme mentioned above to the signal ADP processing apparatus of the line common posterior (downstream) installation scheme will eventually give rise to a problem in that the layer-2 processing apparatus is not capable of performing the signal channel identifications for a plurality of lines.

Accordingly, an object of the present invention is to provide an adaptation processing apparatus as well as an ATM switching system which are substantially immune to the disadvantages and problems of the prior art systems described above.

Another object of the present invention is to provide an adaptation processing apparatus and a signal processing unit for the ATM switch which can make it possible to regenerate or reconstitute the buffers in a facilitated manner when error is detected in the course of the reassembling processing.

For achieving the above and other objects which will become apparent as description proceeds, according to an aspect of the present invention, a reassembling memory incorporated in an ADP processing apparatus which is divided into buffers on a cell-by-cell basis (this buffer will be referred to as cell buffers) is proposed, wherein these cell buffers are chained to and from FIFOs (First-In First-Out mechanisms) with the FIFOs being classified into the following three groups.

(1) a plurality of first FIFOs for assembling a frame, (2) second FIFOs including a plurality of FIFOs provided for every layer-2 processing apparatuses, respectively, for queuing data waiting for sending to the layer-2 processing apparatuses and a scrapping FIFO for regenerating the cell buffer when error is detected in the course of the reassembling processing, and (3) an idle FIFO waiting for cell reception.

According to the teachings of the present invention, the FIFOs for the reassembling processing are divided into the first FIFOs and the second FIFOs. The second FIFOs are constituted by a plurality of FIFOs provided for every layer-2 processing apparatus and the scraping FIFO for error processing. It is possible to execute simultaneous ADP processings for a plurality of layer-2 processing apparatuses, while facilitating the regeneration of the cell buffer upon detection of error.

DESCRIPTION OF THE PREFERRED EMBODIMENTS

In the following, the present invention will be described in detail in conjunction with exemplary or preferred embodiments thereof by reference to the accompanying drawings.

Figure 2:
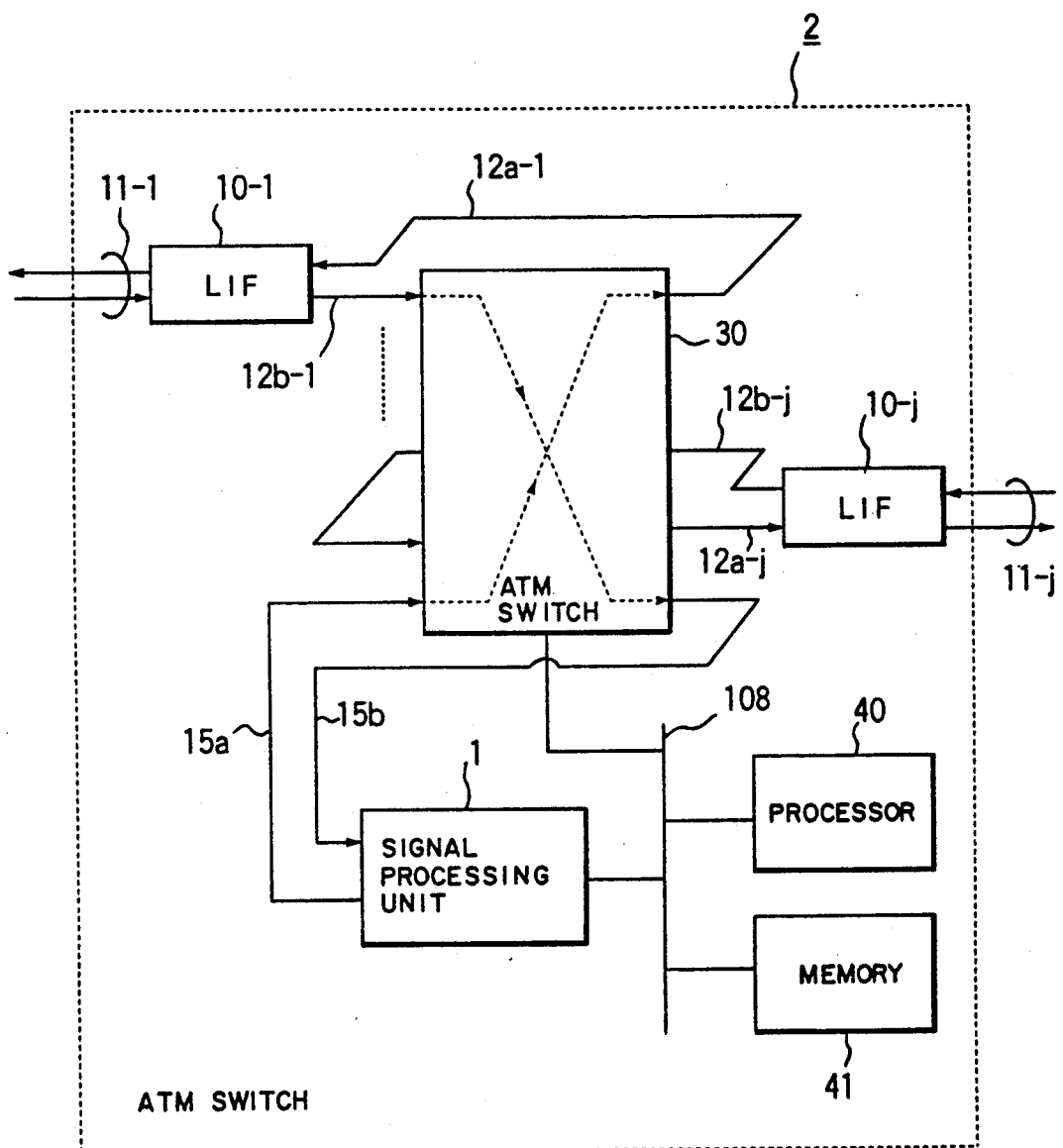
FIG. 2 is a schematic circuit diagram showing a general arrangement of an ATM switching system.

FIG. 2 shows, by way of example, a system structure of an ATM (Asynchronous Transfer Mode) switching system to which the present invention is applied. Referring to the figure, a signal processing unit 1 is connected to an ATM switch 30 by way of a bus 15 (representing collectively a transmission bus 15a and a reception bus 15b). Further, the signal processing unit 1 is connected through a bus 108 to a processor 40 which is adapted to perform protocol processing (call processing) for a layer 3 of a signal channel, updating processing of a header translation table described hereinafter, initialization of the ATM switch 30 and other processings. A reference numeral 41 denotes a memory which is used as a storage area for storing programs executed by the processor 40 and as work areas. Reference symbols 11-1 to 11-j (collectively referred to as 11) designate optical fibers exhibiting a data transmission rate, for example, of 150 M bits/sec. or 600 M bits/sec.. Further, reference numerals 12-1 to 12-j (collectively referred to as 12) and 15 denotes pairs of transmission buses and reception buses, respectively, each of an eight-bit width. A line interface (hereinafter referred to as LIF) 10 (represented by interfaces 10-1 to 10-j) serves for optical/electric signal conversion, translation of header parts of individual cells and the like operations.

The ATM switch 30 is designed for exchanging cells, each of a fixed length, and may be constituted by a switch disclosed in a technical report SSE88-56 published by The Institute of Electronics, Information and Communication Engineers of Japan under the title "A Proposal of ATM Switch Architecture". Now, let's assume, by way of example, that the number of available input/output buses of the ATM switch 30 is 65×65. In that case, since a pair of the input bus and the output bus is used for the processing of one line, as can be seen in the figure, it is possible to install subscriber's lines or transit (trunk) lines up to 64 lines by using one pair of input/output buses for the signal processing purpose. Parenthetically, in the case of the instant embodiment, the signal channel processing for a plurality of subscriber's lines and transit or trunk lines is realized by one and the same signal processing unit. Accordingly, the number of the input/output buses for the signal processing required by one ATM switch may be one pair. The remaining 64 pairs of the input/output buses, exclusive of those for the signal processing, may be allocated to the subscriber's lines or trunk lines in arbitrary numbers, respectively. For example, the numbers of the subscriber's lines and the trunk lines may be 32 lines each or alternatively 56 and 8 lines, respectively.

Figure 3:
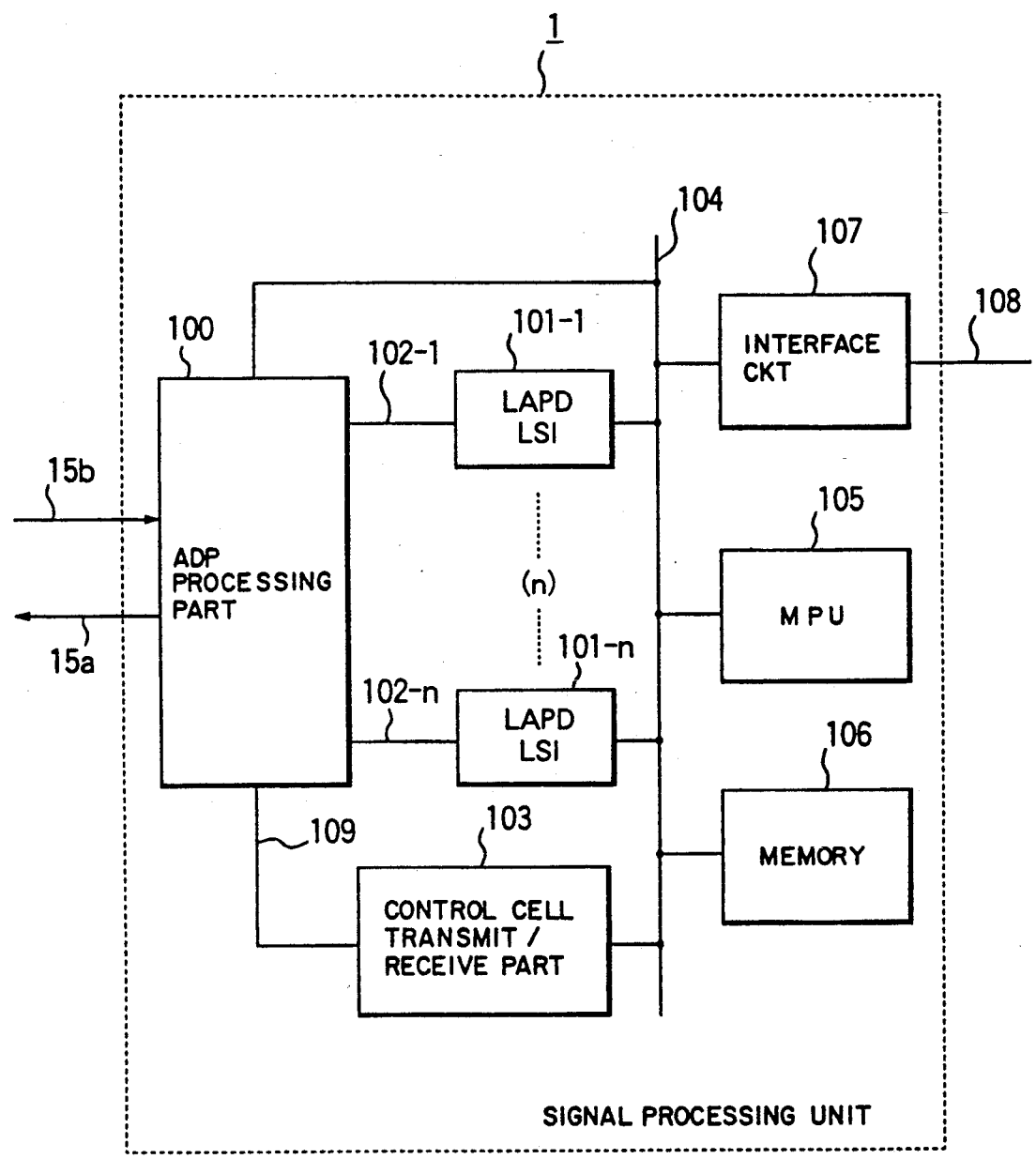
FIG. 3 is a schematic circuit diagram showing a signal processing unit (1) which constitutes a part of the ATM switching system shown in FIG. 2.

FIG. 3 is a block diagram showing an arrangement of the signal processing unit 1 mentioned above. As can be seen in the figure, the signal processing unit 1 is composed of an ADP processing apparatus part 100 for performing adaptation processings including segmentation, reassembly and the like, n LAPD-LSIs 101 (represented by 101-1 to 101-n) for processing LAPD (Link Access Procedure on the D-channel) which represent a protocol for a layer 2 of the signal channel, a control cell transmission/reception part 103 for performing transmission and reception of "control cells" for reading/writing the contents of the header translation table incorporated in the LIF as described hereinafter, an interface circuit 107 for allowing transaction or transfer of information between the processor 40 mentioned previously and the signal processing unit 1, a MPU (microprocessing unit) 105 for performing control of the abovementioned LAPD-LSIs 101, a memory 106 used as storage areas for storing programs executed by the MPU 105 as well as areas for data transfer between the processor 40 and the MPU 105 and data transfer between the MPU 105 and the LAPD-LSIs 101, a bus 109 for transmitting control cell data, signal lines 102 (representing collectively lines 102-1 to 102-n) for transmitting signal frame data and each having a data transmission rate, for example, or 64 K bits/sec. or 1.5 M bits/sec., and a bus 104.

The ADP processing apparatus or part 100, the LAPD-LSIs 101, the control cell transmission/reception part 103, the interface circuit 107, the MPU 105 and the memory 106 mentioned above are connected to one another by way of the bus 104. Further, the ADP processing part 100 is connected to the ATM switch 30 through the bus 15 (including the transmission bus 15a and the reception bus 15b), to the LAPD-LSIs 101 through the signal lines 102 and to the control cell transmission/reception part 103 through the bus 109. On the other hand, the interface circuit 107 is connected to the processor 40 and the memory 41 through the bus 108.

Figure 1:
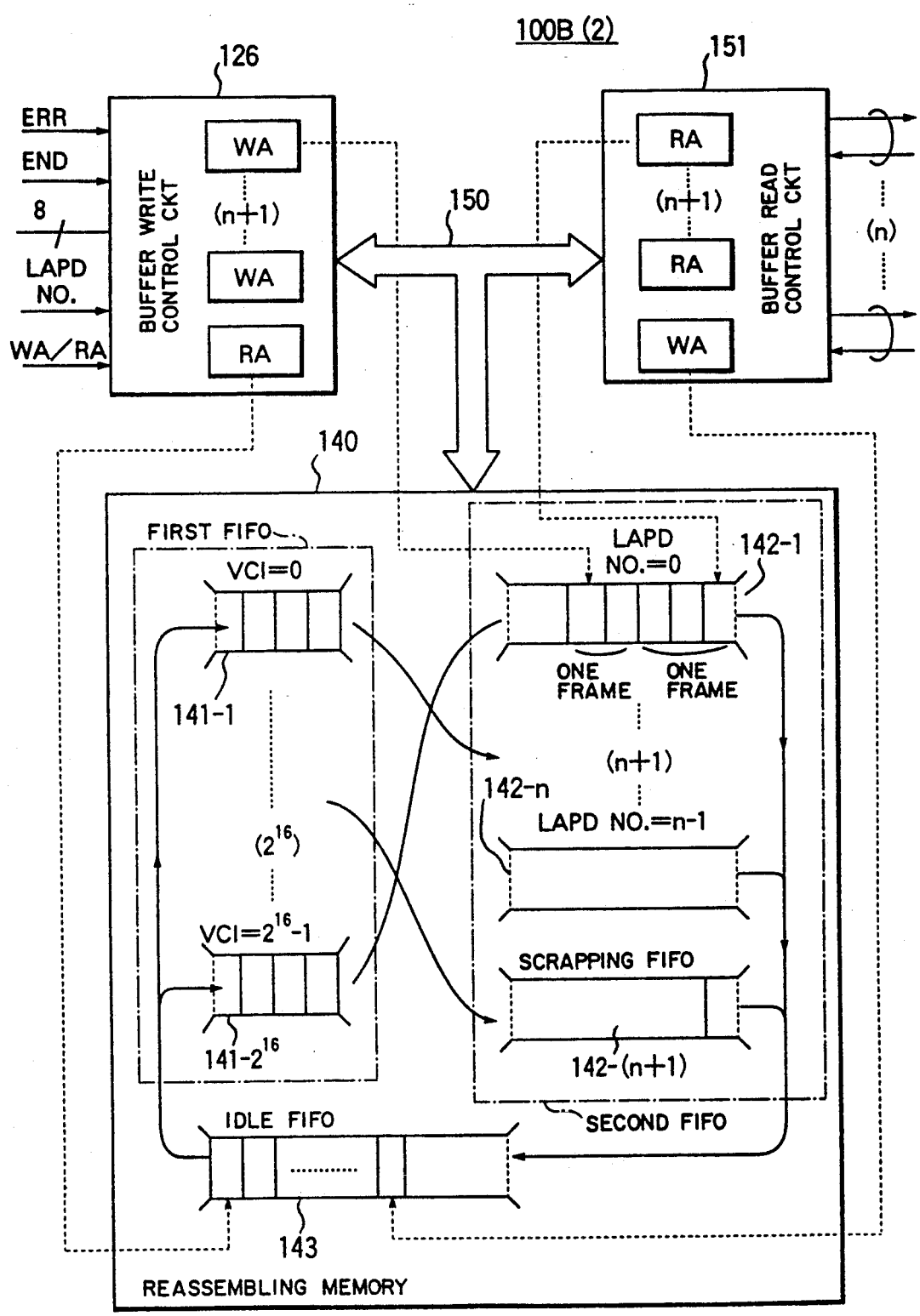
FIG. 1 is a block diagram showing a structure of a major part of a receiving system (100 B) in an ADP processing apparatus 100 according to an exemplary embodiment of the invention.
Figure 4:
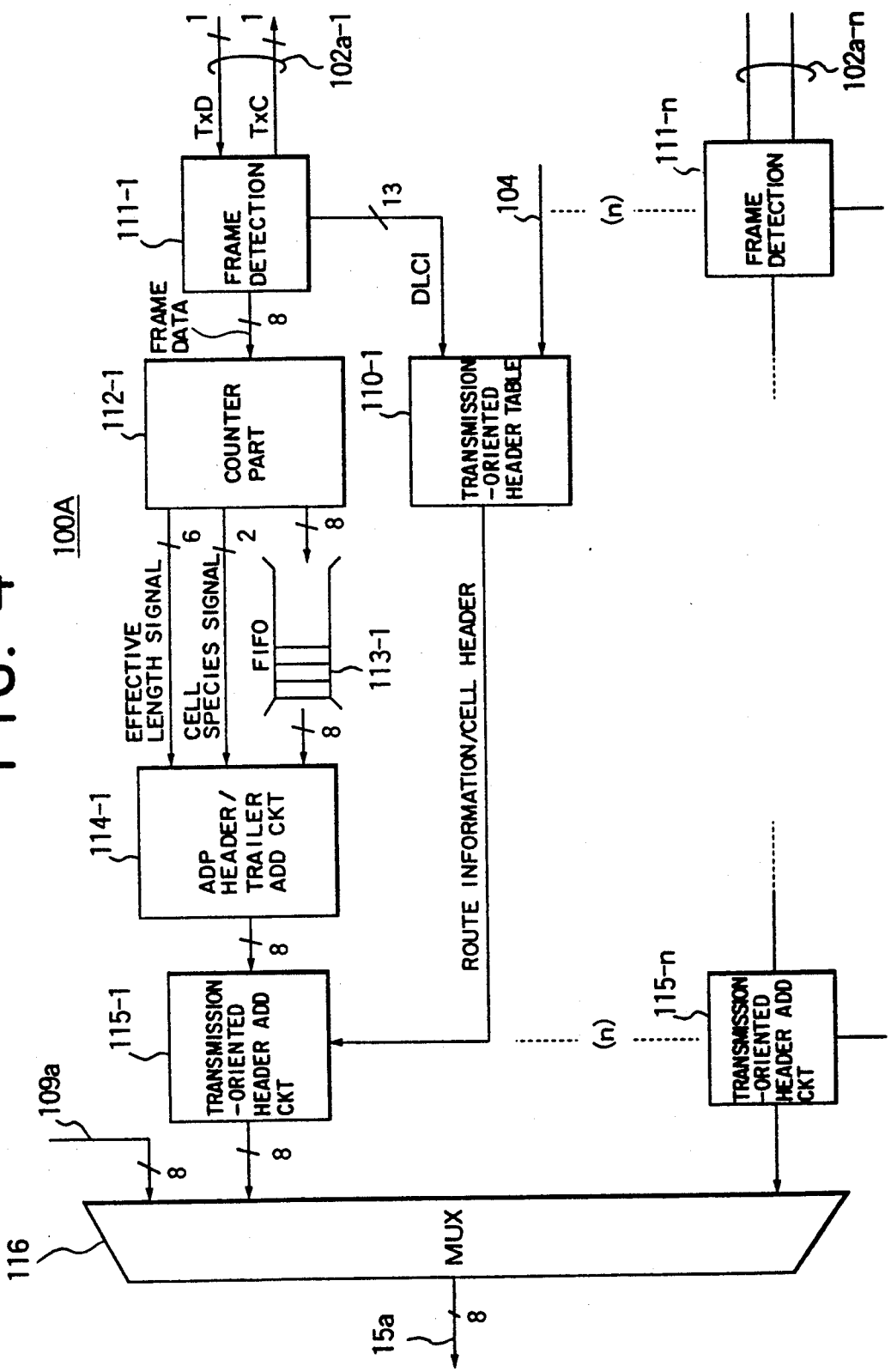
FIG. 4 is a schematic circuit diagram showing a structure of a transmitting system (100A) in an ADP processing part shown in FIG. 3.
Figure 5:
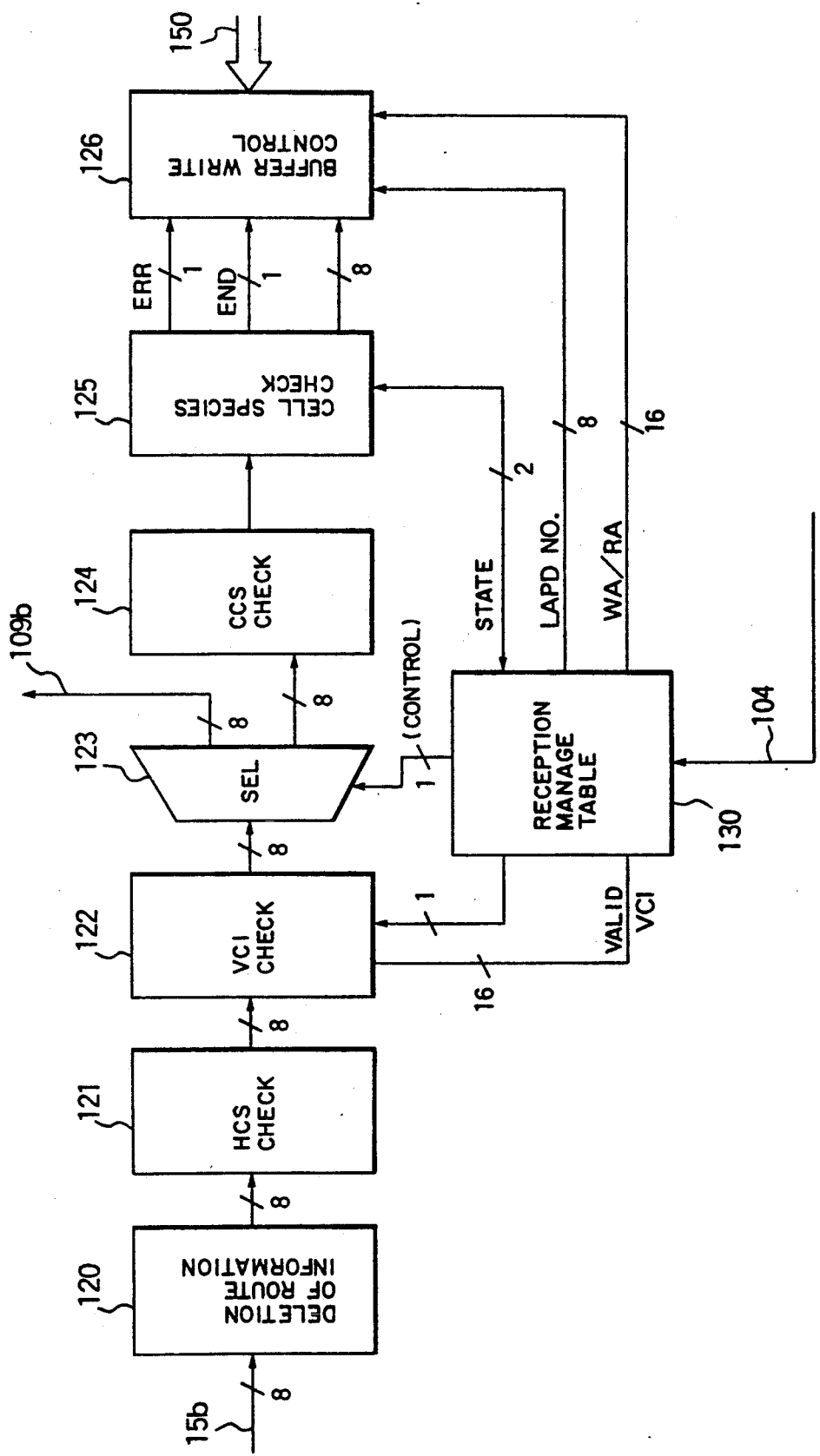
FIG. 5 is a block diagram showing a major part constituting the receiving system (100B) of the ADP processing part in corporation with the system shown in FIG. 1.
Figure 6:
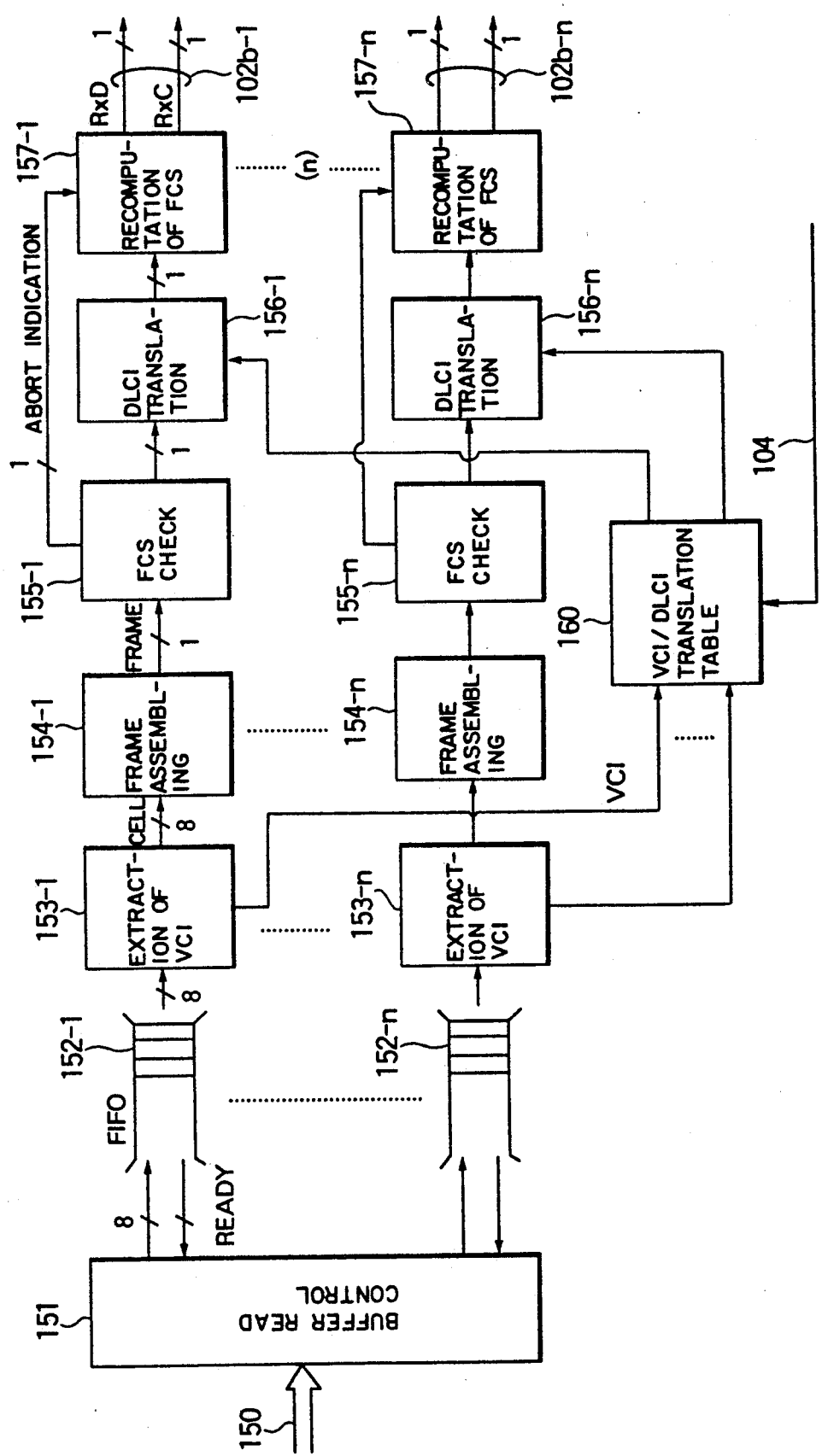
FIG. 6 is a block diagram showing another major part constituting the receiving system (100B) of the ADP processing part in cooperation with the system shown in FIG. 1.

FIG. 4 is a block diagram showing a structure of a transmission system 100A in the ADP processing part 100, while FIGS. 1, 5 and 6 are block diagrams showing a reception system 100B in the ADP processing part 100.

In conjunction with the CCITT Recommendations I. 121 (blue book) mentioned hereinbefore, it is noted that details of the cell format concerning the adaptation layer have not been determined yet. Under the circumstances, the cell format illustrated in FIG. 22B is presumed to be adopted in the ADP processing part shown in FIGS. 1, 4, 5 and 6.

More specifically, each cell is of 53 bytes and includes a cell header 52 of 5 bytes and an information field 53 of 48 bytes. It is assumed that the leading sixteen bits of the cell header 52 constitute a VCI (Virtual Channel Identifier) field 520. Further, the cell header 52 includes a reserved field 521 and a HCS (Header Check Sequence) field 522 for detecting abnormality of the cell header. Referring to FIG. 22A, DLCI (Data Link Connection Identifier) of an address field labeled "ADDRESS" serves as a connection identifier for the layer 2 (data link layer) located at a high level in the adaptation layers. Similarly, the VCI field 520 plays a role of a connection identifier for the ATM layer located at a low level in the adaptation layers. The information field 53 is composed of an ADP header 54 of 2 bytes, a payload 50 of 44 bytes and an ADP trailer 56 of 2 bytes. It is assumed that the ADP header 54 includes a cell species field 540 of 2 bits indicating whether a cell of concern is a leading cell of a frame (hereinafter referred to as the frame leading cell), a last cell of the frame, an intermediate cell or a cell equal to one frame (hereinafter referred to as the frame equality cell), and a MID (Message Identifier) 541 of 14 bits used for a frame-based identification for connectionless communication. It is however assumed that all the signal channels are designed for the connection-oriented communication in the signal processing, and thus the MID field is not used.

It is assumed that the payload 55 stores therein frame data shown in FIG. 22A except for the flags, i.e. data covering those of the address field to a FCS (Frame Check Sequence) field. It is further presumed that the ADP trailer 56 includes a field 560 of 6 bits for indicating an effective information length of the data stored in the payload 50 and a CCS (Cell Check Sequence) field of 10 bits for detecting abnormality of the information field 53.

At this juncture, assuming that the inter-flag frame length of the frame 50 shown in FIG. 22A is of 8 bytes, segmentation into cells results in a cell having the effective information length of 8 bytes whose cell species is the frame equality cell (one cell equal to one frame). On the other hand, in case the frame length is of 100 bytes, the cell segmentation results in a first cell of the frame-leading cell species having the effective information length of 44 bytes, a second cell of the intermediate cell species having the effective information length of 44 bytes and a third cell of the last cell species having the effective information length of 12 bytes.

Incidentally, a route information field 56 affixed in precedence to the cell is employed only in the ATM switch. In other words, on the subscriber's trunk lines, the cells are transmitted with the route information field 56 having been deleted. As is shown in FIG. 1 of the Paper B-167 published in the National Convention held by the Institute of Electronics, Information and Communication Engineers of Japan in 1989, autumn, the ATM switch 30 is usually constituted by a plurality of switches connected in a multiplicity of stages. Accordingly, the route information field mentioned above is used for recording information indicating the output bus to which the cell is to be transmitted upon cell exchanges by the ATM switches at the various stages.

Next, description will be made in detail of the transmission system 100A in the ADP processing part by reference to FIG. 4.

In FIG. 4, a frame detecting circuit 111 (representing collectively the circuits 111-1 to 111-n) is connected to the corresponding LAPD-LSI 101 (representing collectively 101-1 to 101-n) by way of a signal line 102a (representing collectively 102a-1 to 102a-n) which includes pair of lines for data to be transmitted (TxD) and clock for transmission (TxC) for detecting the frame shown in FIG. 22A to thereby input the DLCI of the intra-frame address field to a transmission-oriented header table 110 (representing correctively 110-1 to 110-n) while sending the frame data located in the address to FSC fields to a counter 112 (112-1 to 112-n) in the form of 8-bit parallel data after deletion of "0" bit for the flag identification.

Figure 7:
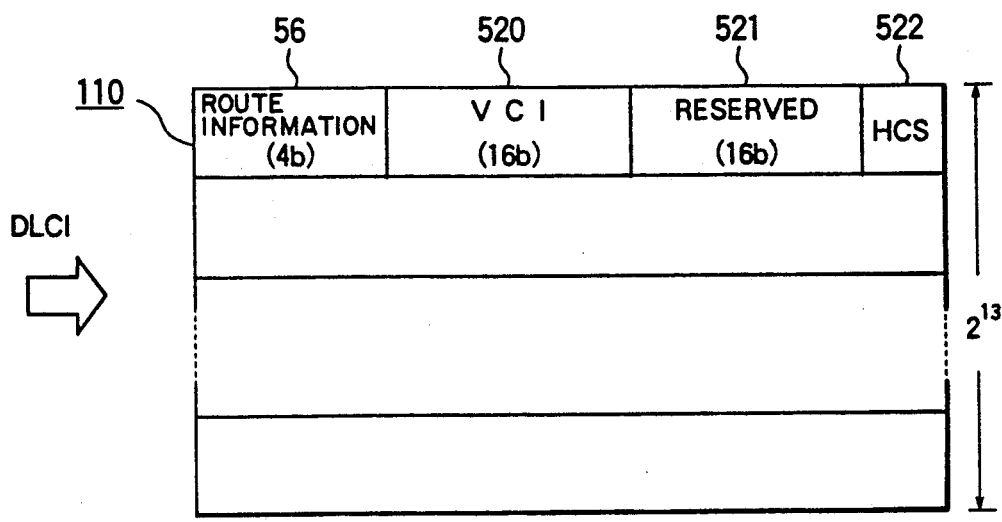
FIG. 7 is a diagram showing a structure of a transmission header table (110)

As shown in FIG. 7, the transmission-oriented header table 110 stores at the address corresponding to the value of the input DLCI a record composed of the route information 56 and the header information 52 of the transmission cell including the VCI 250 and is capable of outputting to a transmission-oriented header adding circuit 115 (115-1 to 115-n) the record at the address corresponding to the DLCI supplied from the frame detection circuit 111. Incidentally, the contents of the transmission-oriented header table 110 are set up by the processor 40 by way of the bus 108, the interface circuit 107 and the bus 104.

The counter 112 transfers the frame data to a FIFO 113 (representing collectively FIFOs 113-1 to 113-n) shown in FIG. 4 and at the same time counts the number of bytes of the data transferred. When the number of the bytes transferred has attained 44 bytes which is a maximum value capable of being stored in the payload of one cell or when the last data of the frame has been transferred, a cell species indication 540 and the effective information length 560 shown in the cell format of FIG. 22B are messaged to an ADP header trailer adding circuit 114 (representing collectively 114-1 to 114-n).

In response to reception of the abovementioned message, the ADP header trailer adding circuit 114 generates an ADP header 54 of the format shown in FIG. 22B and transfers the data of the cell information field 53 to the transmission-oriented header adding circuit 115 in the order of the ADP header 54, data in the FIFO 113 and the effective information length 560. Finally, the CCS 561 determined arithmetically in parallel with the transfer processing mentioned above is transferred, whereupon transfer processing of the information field 53 of one cell is completed. In conjunction with the transfer of the data in the FIFO 113, it should be mentioned that only the data of the effective information length messaged from the counter part 112 is transferred and when the effective information length is smaller than the maximum value of 44 bytes, dummy data such as "0," are consecutively transferred so that the payload 55 is necessarily of 44 bytes. At this juncture, it should also be mentioned that the FIFO 113 be implemented with a capacity equivalent to or greater than the payload bytes of one cell, e.g. a capacity of 88 bytes, to thereby prevent occurrence of overflow of the frame data in the FIFO 113.

The transmission-oriented header adding circuit 115 functions to add the record composed of the cell header 52 and the route information 56 read out from the transmission-oriented header table 110 to the leading end or beginning of the information field 53, which is then sent to a cell multiplexing circuit (MUX) 116.

It should be noted that the frame detection circuit 111, the transmission-oriented header table 110, the counter part 112, the FIFO 113, the ADP header trailer add circuit 114, and the transmission-oriented header add circuit 115 are provided for each of n LAPD-LSIs 101.

The cell multiplexing circuit 116 transfers to the ATM switch 30 through the transmission bus 15a the cell data supplied from the transmission-oriented header adding circuit 115 (115-1 to 115-n) as well as the cell data supplied from the control cell transmission/reception part 103 via the transmission bus 109a.

Next, description will be turned to details of the receiving system 100B of the ADP processing part 100B by reference to FIGS. 1, 5 and 6.

A route information deleting circuit 120 shown in FIG. 5 is connected to the ATM switch 30 via the bus 15b and operates to delete the route information shown in FIG. 22B from the cell data of the signal channel inputted from the ATM switch.

A HCS check circuit 121 performs error check of the cell header by using the HCS field 522 of the cell header 52 for thereby scrapping the cell data for which the error insusceptible to correction is detected.

A VCI check circuit 122 serves to input the VCI 520 of the cell header 52 to a reception management table 130, which responds thereto by sending back a signal indicating whether the VCI is valid or invalid. When the VCI is valid, the cell data including the cell header 52 and the information field 53 is transferred to the SEL 123. When it is invalid, the cell data is scrapped. Since the cell data supplied to the signal processing unit 1 from the ATM switch 30 by way of the reception bus 156 is either only the control cell data or the cell data of the signal channel having the VCI allocated previously by the processor 40, as will be described hereinafter, the reception management table 130 does not send back the invalidity indication signal in principle. However, when the cell data having, for example, the VCI of the information channel is inputted due to erroneous operation of the ATM switch, the invalidity indication signal is sent back, whereby the relevant cell data is scrapped.

Figure 8:
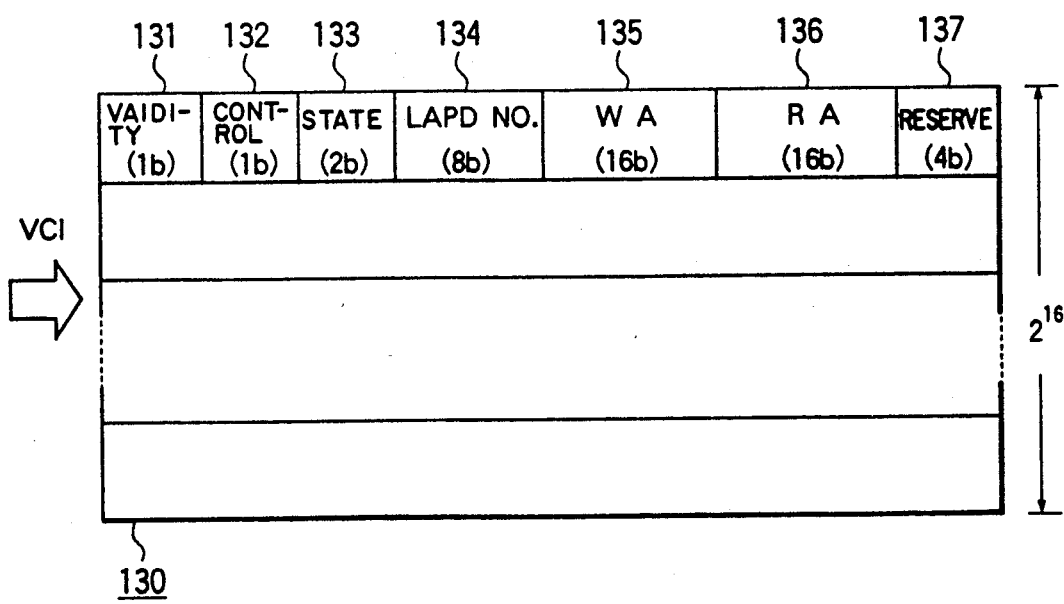
FIG. 8 is a diagram showing a structure of a reception management table (130)

As can be seen in FIG. 8, the reception management table 130 stores at the address corresponding to the value of the input VCI a record consisting of validity indication 131 of one bit, control cell indication 132 of one bit, reassembly state 133 of two bits, LAPD No. 134 of eight bits, WA (Write Address) 135 of a first FIFO described later on, RA (Read Address) 136 of the first FIFO and four reserve bits and is capable of outputting the individual fields of the record from the address corresponding to the VCI inputted from the VCI check circuit 122 to a VCI check circuit 122, a selector SEL 123, a CCS check circuit 124, a cell species check circuit 125 and a buffer write control circuit 126 shown in FIG. 5. Further, the fields of the reassembly state 133, the WA 135 and the RA 136 can be written in the reception management table 130 from the associated output destination circuits (for updating the contents of the table 130).

Parenthetically, the contents of the reception management table 130 are initialized for every VCI record by way of the bus 108, the interface circuit 107 and the bus 104 at the time point when the processor 40 messages to the subscriber's terminal of other ATM switch the allocation of VCI for the signal channel. Although the procedure for allocating the signal channel VCI has not been determined by the CCITT recommendation yet, a proposal of that procedure is disclosed in the Paper B-169 under the title "A study on ATM Signalling Method which takes account of Meta-signaling Procedure" published in the National Convention of the Institute of Electronics, Information and Communication Engineers of Japan held in autumn, 1989.

The SEL 123 responds to the control cell indication signal inputted from the reception management table 130 to thereby transfer the cell data inputted from the VCI check circuit 122 to a control cell transmission/reception part 103 through the bus 109b, when the signal mentioned above indicates the control cell while sending the cell data to a CCS check circuit 124, unless the signal indicates the control cell.

The CCS check circuit 124 performs an error check of the information field 53 of the cell with the aid of the CCS field 156 included in the ADP trailer 56, wherein upon detection of the error insusceptible to correction, the cell data is scrapped.

The cell species check circuit 125 performs comparison between the cell species field 540 of the cell data inputted from the CCS check circuit 124 and the reassembly state of two bits inputted from the reception management table 130 to thereby execute on of four types of processings mentioned below.

(1) Storage in First FIFO

Assuming, by way of example, that the first FIFO described hereinafter is in the empty or unoccupied state and receives the cell data of the cell species "frame leading cell" or receives the cell data of the cell species "intermediate cell" after reception of the frame leading cell, the cell species check circuit 125 transfers the cell data to the buffer write control circuit 126 which responds thereto by storing the cell data in the first FIFO which corresponds to the received VCI.

In this case, neither ERR signal nor END signal which will be described hereinafter are sent out.

(2) Storage in First FIFO and Transfer to Second FIFO

Upon reception of a cell of the last cell species after the processing (1) mentioned above or "frame equality cell" in the empty state of the first FIFO, the same processing as the abovementioned processing (1) is performed. In this case, the cell data of the amount just corresponding to one frame is stored in the first FIFO. Further, the cell species check circuit 125 issues a request by way of the END signal line that all the cell data of the received VCI in the first FIFO be transferred to the second FIFO. Upon reception of the END signal, the buffer write control circuit 126 transfers all the cell data in the first FIFOs to the second FIFOs which correspond, respectively, to the LAPD Nos. inputted from the reception management table 130.

It should be mentioned that the processing for transferring the cell data to the second FIFO from the first FIFO is not executed by reading/writing the cell data itself but only by updating WA, RA and NP.

(3) Scrapping of Data in First FIFO and Storage in First FIFO

Assuming, for example, that the cell of the species "frame leading cell" or "frame equality cell" having the same VCI is again received after the processing (1) described previously, the cell data in the first FIFO received already can not complete one frame data. Such situation may take place when the cell of the species "last cell" is lost, as will be described hereinafter. Accordingly, in this case, the cell species check circuit 125 issues a request by way of the ERR signal line that all the cell data of the received VCI in the first FIFO be transferred to the scrapping FIFO. Upon reception of the ERR signal, the buffer write control circuit 126 transfers all the received cell data in the first FIFO to the scrapping FIFO, as in the case of the processing (2) mentioned above.

Subsequently, the cell species check circuit 125 and the buffer write control circuit 126 perform the same processing as the abovementioned processing (1) to thereby store the cell data newly received in the first FIFO. However, in case the cell received is of the species "frame equality cell", the same processing as the abovementioned processing (2) is further performed to store the cell data of the first FIFO in the second FIFO.

(4) Scrapping of Cell

Assuming, by way of example, that the cell of the intermediate cell species or the last cell species is received in the empty state of the first FIFO, the cell data is scrapped by the cell species check circuit 125 without being transferred to the buffer write control circuit 126.

At this juncture, it should be mentioned that after completion of the processing described above, the cell species check circuit 125 records the value of the cell species field of the cell received newly in the stat field part 133 of the corresponding record stored in the reception management table 130.

Assuming further that when only the cell of the last cell species of the plural cells generated from one frame is lost or scrapped due to error with only the remaining cells being received, the latter remain stored in the first FIFO. Certainly, these remaining cells can be scrapped through the processing (3) described hereinbefore. However, unless the cells exemplified by those mentioned above in conjunction with the processing (3) are received, the cell buffer of the memory 140 for reassembly is occupied by the data of these cells over a long period, giving rise to a problem that difficulty is encountered in the reassembling processing with other VCIs. In order to evade such undesirable situation, it is preferred to incorporate a timer in the buffer write control circuit 126 for thereby allowing the cell data stored in the first FIFO for a time longer than a predetermined period to be forcibly transferred to the scrapping FIFO.

It is further conceivable that a terminal operator transmits maliciously cell data of a frame of an endless length. In that case, the cell buffer of the memory 140 for reassembly may be occupied by these cell data to make impossible the reassembly processing with other VCIs. In order to evade this problem, it is preferred to incorporate a counter in the reception management table 130 for recording the number of cells stored in the first FIFO, wherein when the content of this counter has attained a predetermined value, the cell data in the first FIFO is forcibly transferred to the scrapping FIFO.

Now, the buffer write control circuit 126 performs the processings for storage (writing) of the received cell data in the first FIFO, transfer of the cell data from the first FIFO to the second FIFO and other processings by way of the bus 150, as described hereinbefore.

For storage of the cell data in the first FIFO, a cell buffer is newly secured from an idle FIFO 143 shown in FIG. 1, whereon the cell data composed of the cell header 52 and the information field 53 is written in the abovementioned buffer. Subsequently, this buffer is connected to the first FIFO by resorting to a method described hereinafter while using the WA and the RA supplied from the reception management table 130. Also in the case of the transfer of the cell data from the first FIFO to the second FIFO, use is made of the WA and the RA. However, in case no new cell buffer is available in the idle FIFO, the cell data as received are scrapped by the buffer write control circuit 126. After the processing described above, the buffer write control circuit 126 updates the WA 135 and the RA 136 of the corresponding record resident in the reception management table 130.

Figure 9:
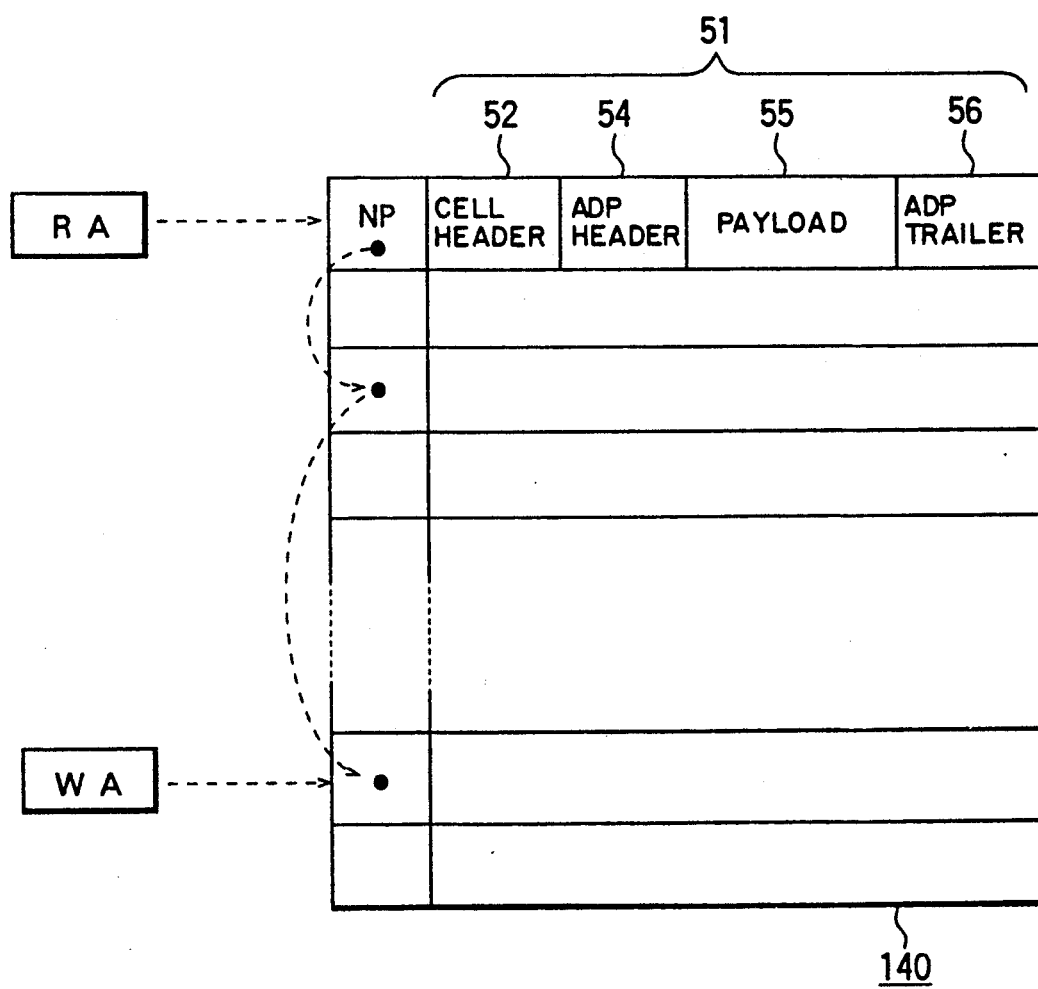
FIG. 9 is a diagram showing a structure of a memory for reassembling.

The memory 140 for reassembly shown in FIG. 1 is connected to a buffer write control circuit 126 and a buffer read control circuit 152 through a bus 150 and has a function of storing therein once the received cell data, as shown in FIG. 9. The reassembly dedicated memory 140 is divided into a plurality of cell buffers, as described hereinbefore, and constitute a FIFO by using WA (Write Address), RA (Read Address) and NP (Next Pointer) of each cell buffer.

More specifically, the reassembly dedicated memory 140 is divided into a plurality of cell buffers each constituted by the NP and a cell data storage area, wherein NP indicates the start address of the succeeding cell buffer.

As will be appreciated from the foregoing, there are three types of FIFOs which will be described below in more detail.

(1) First FIFO (141-1 to 141-$2^{16}$)

This FIFO is used for storing the cell data corresponding to one frame. Since the VCI field 520 is of a 16-bit width, as can be seen in FIG. 22B, there are provided the FIFOs in a total number of $2^{16}$ for VCIS, respectively.

Figure 10:
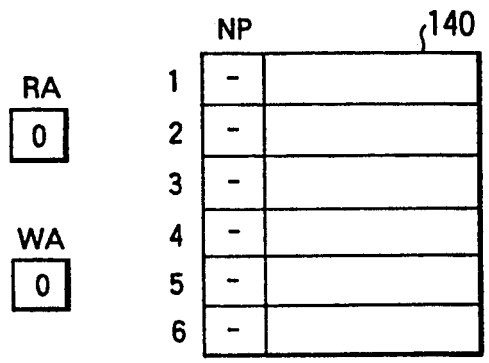
FIGS. 10A and 10B are diagrams for illustrating a method of structurizing a first FIFO.
Figure 10:
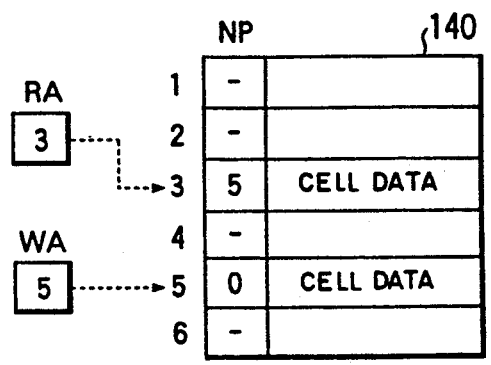

FIGS. 10A and 10B are views for illustrating a method of structurizing the first FIFO. More specifically, FIG. 10A shows, by way of example, the FIFO in the state where no cell data is stored, while FIG. 10B shows the FIFO in the state where two cell data are stored therein. The addresses WA and RA of the first FIFO are stored in the reception management table 130 shown in FIG. 8 and designate the cell buffer addresses of exit and entrance of the FIFO, respectively. However, when WA=RA =0, as shown in FIG. 10A, this means that no cell data is stored in the FIFO.

Parenthetically, the first FIFO differs from the second FIFO and the idle FIFO described below in that the former has no dummy cell buffers. This is because there are required as man as 64 K dummy cell buffers if the first FIFO should be provided with the dummy cell buffers.

(2) Second FIFO (142-1 to 142-(n+1))

The second FIFOs include (n+1) FIFOs in total, wherein n FIFOs are provided for LAPD-LSIs 101-1 to 101-n, respectively, and one scrapping FIFO for scrapping the cell buffers in the first FIFO upon detection of error by the cell species check circuit 125. The second FIFO stores therein the cell data waiting for the transfer processing to the LAPD-LSI or the cell data waiting for the scrap processing. Thus, in contrast to the first FIFO which is not loaded with the cell data in an amount exceeding one frame, the second FIFO may be loaded with the cell data corresponding to two or more frames, as in the case of the FIFO (142-1) of LAPD No.=0 shown in FIG. 1.

Figure 11:
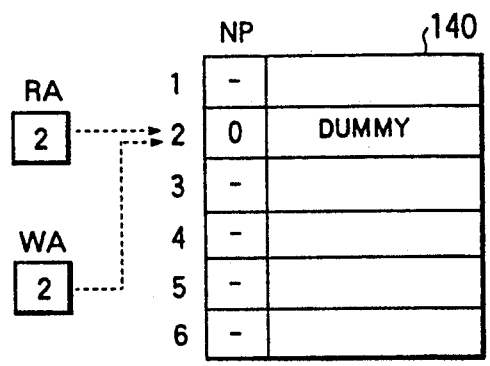
FIGS. 11A and 11B are diagrams for illustrating a method of structurizing a second FIFO.
Figure 11:
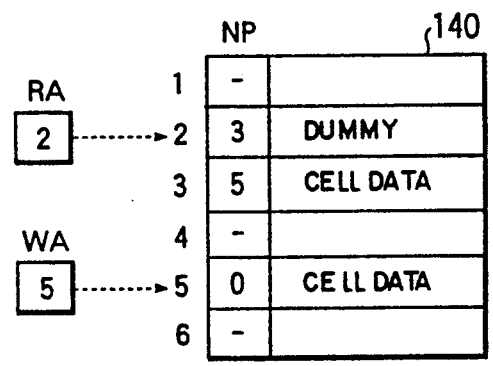

FIGS. 11A and 11B illustrate a method of structurizing the second FIFO. More specifically, FIG. 11A shows the second FIFO in the state where no cell data is stored, while FIG. 11B shows it in the state where two cell data are stored therein.

The (n+1) addresses WA for the second FIFOs are stored in the buffer write control circuit 126, while the addresses RA are stored in the buffer read control circuit 151. In this conjunction, it is assumed that the address designated by the RA is necessarily associated with the dummy cell buffer, wherein NP having a value of "0" in the dummy cell buffer indicates that no cell data is stored in the FIFO.

The reason why the method of indicating storage of no data cell in the FIFO differs from the method for the first FIFO is explained by the fact that the addresses WA and RA for the second FIFO exist in the different control circuits, respectively.

More specifically, if the fact that the second FIFO has no cell data stored therein is also expressed by "WA=RA=0", then the buffer read control circuit 125 will have to update the address RA in buffer read control circuit 151 when the cell data is stored in the second FIFO. In contrast, in the case of the arrangement that the address indicated by RA has necessarily the dummy cell buffer, as described previously, storage of data in the second FIFO can be messaged to the buffer read control circuit 151 from the buffer write control circuit 126 simply by rewriting the NP to a value other than "0" (zero). It is however presumed that the buffer read control circuit 151 periodically checks the NP of the cell buffer designated by the RA.

(3) Idle FIFO (143)

This FIFO serves for storing unused or used cell buffer which stores no cell data.

Figure 12:
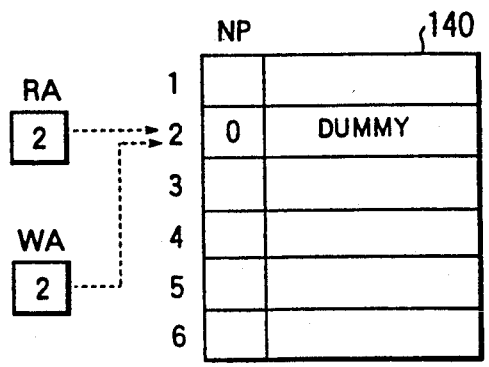
FIGS. 12A and 12B are diagrams for illustrating a method of structurizing an idle FIFO.
Figure 12:
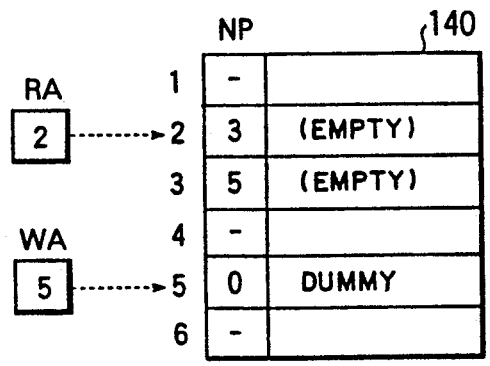

FIGS. 12A and 12B are views for illustrating a method of structurizing the idle FIFO. More specifically, FIGS. 12A shows the idle FIFO in the state where no empty buffer is stored, while FIG. 12B shows the idle FIFO in the state where two empty buffers are stored therein. The address WA of the idle FIFO is stored in the buffer read control 151, while the address RA is stored in the buffer write control circuit 126, wherein it is assumed that when the value of the NP of the cell buffer designated by the RA is zero, this means that no empty buffer is present in the idle FIFO, as with the case of the second FIFO.

However, in contrast to the second FIFO where the cell buffer designated by the RA is necessarily the dummy buffer, the cell buffer designated by the WA is made to be the dummy buffer in the case of the idle FIFO in order to ensure that upon recitation of a cell, the data of the received cell can be immediately transferred to the address designated by the RA of the idle FIFO.

One feature characterizing the present invention is seen in that in conjunction with structurization of FIFO in the memory 140 for the reassembling purpose described above, one of the second FIFOs is provided with the scrapping FIFO. More specifically, when the cell buffer for which error is detected in the course of the reassembling processing is to be scrapped (by transferring it to the idle FIFO) without providing the scrapping FIFO, the processing to this end has to be executed by the buffer write control circuit 126. On the other hand, the processing for transferring the used cell buffer to the idle FIFO is performed by the buffer read control circuit 151. Consequently, the WA of the idle FIFO is shared in common between the two circuits 126 and 151, which gives rise to a problem that control must be performed for possible competition between the two circuits mentioned above in updating the address WA. This problem can be avoided by providing the scrapping FIFO in the second FIFOs according to the teaching of the present invention, because the processing for transferring the cell buffer to the idle FIFO may then be performed only by the buffer read control circuit 151. Further, by locating or positioning the scrapping FIFO as the (n+1)-th second FIFO (where n represents the number of LAPD-LSIs), the cell buffer scrapping processing performed upon occurrence of error can be realized through the utterly same procedure as that for the processing for transferring the cell buffers from the first FIFOs to the second FIFOs in the state where no error takes place, which in turn means that the design of the buffer write control circuit 126 is much facilitated to advantage.

Now referring to FIGS. 13 to 18, examples of the procedure for updating the WA and the RA of the first FIFO (referred to as 1st WA and 1st RA, respectively), the WA and the RA of the second FIFO (termed 2nd WA and 2nd RA, respectively) and the WA and the RA of the idle FIFO (represented by IWA and IRA, respectively) will be described on the assumption that one frame divided into three cells (leading, intermediate and last cells) has arrived. In this connection, forms of description shown below as explanatory remarks 1) to 4) are adopted.

Explanatory Remarks 1) 1st WA←(IRA)

The value of RA of the idle FIFO is transferred to WA of the first FIFO.

2) IRA←(NP) IRA

The value of the cell buffer designated by RA of the idle FIFO is transferred to RA of the idle FIFO.

3) (NP) 1st WA←0

The value of NP of the cell buffer designated by the 1st WA is set to "0".

4) (Cell Buffer) 1st WA←(Cell Data)

Receiving cell data is transferred to the cell buffer designated by the 1st WA.

Figure 13:
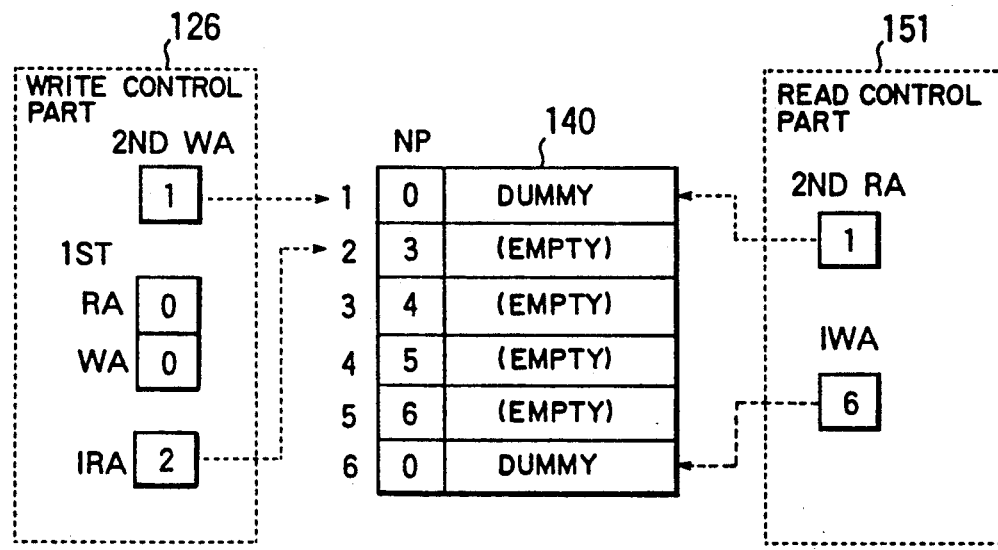
FIG. 13 is a diagram showing the first, second and idle FIFOs in the initialized state.

FIG. 13 is a view showing the state at the time of initialization where cell data is stored in neither the first FIFO nor the second FIFO with empty buffers being stored only in the idle FIFO.

Upon reception of the frame leading cell in the state mentioned above, the buffer write control circuit 126 executes the processing mentioned below.

1st WA←(RA)
IRA←(NP) IRA
(Cell Buffer) 1st WA←(Cell Data)
(NP) 1st WA←0
1st RA←(1st WA)

Figure 14:
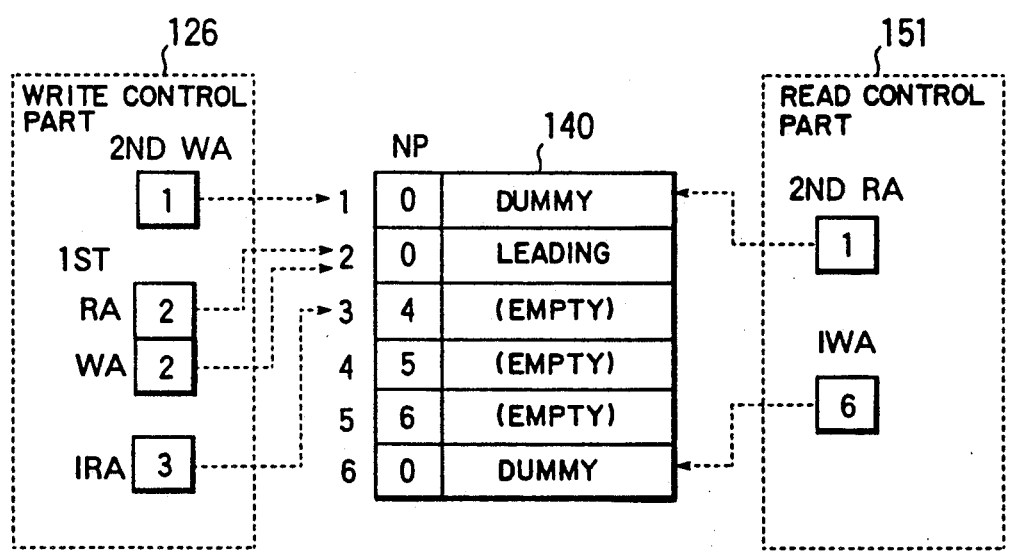
FIGS. 14 to 18 are views similar to FIG. 13 and show different states of the first, second and idle FIFOs after various processings, respectively.

FIG. 14 shows the state attained after the above processings have been executed. In the state shown in FIG. 4, the frame leading cell is stored in the first FIFO.

Upon reception of the intermediate cell, the buffer write control circuit 126 performs the processings mentioned below.

1st WA←(IRA)
IRA←(NP) IRA
(Cell Buffer) 1st WA←(Cell Data)
(NP) 1st Wa←0

Figure 15:
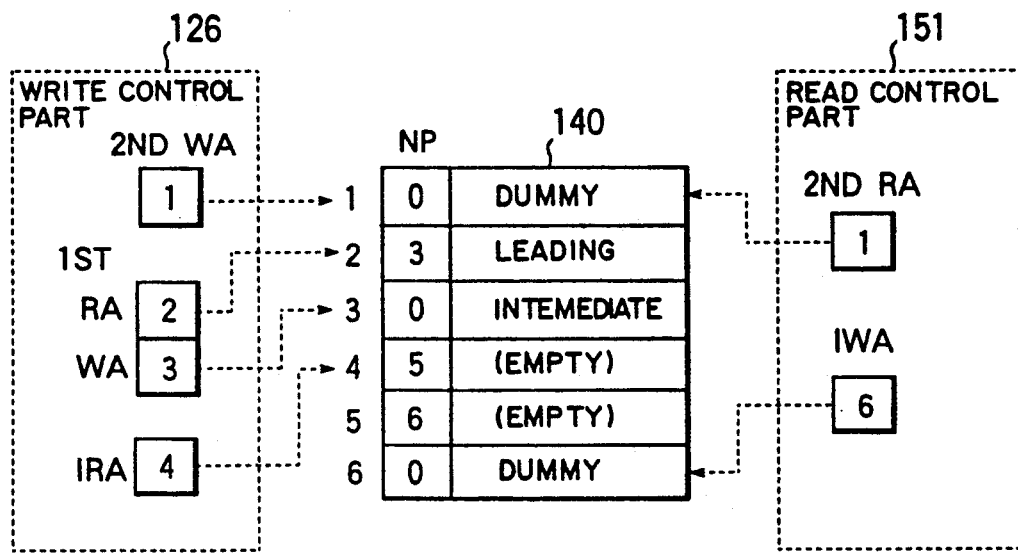

The state attained after execution of the abovementioned processings is shown in FIG. 15. In this state, the frame leading cell and the intermediate cell are stored in the first FIFO.

Upon reception of the last cell the buffer write control circuit 126 performs the processings mentioned below.

1st WA+(IRA)
IRA+(NP) IRA
(Cell Buffer) 1st WA←(Cell Data)
(NP) 1st WA+0

Figure 16:
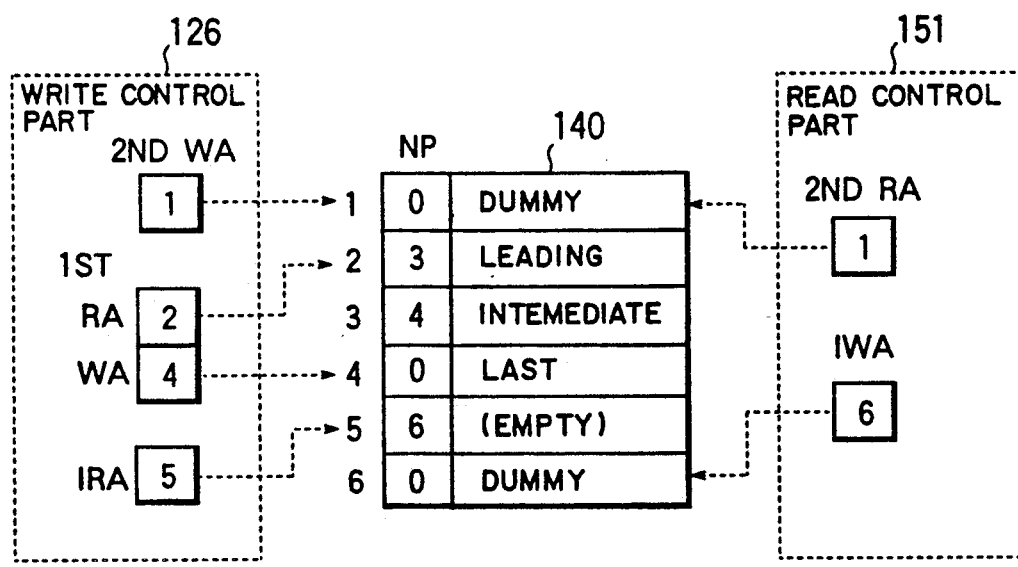

The state attained after execution of the above processings is shown in FIG. 16. In this state, there are stored in the first FIFO the frame leading cell, the intermediate cell and the last cell.

Upon reception of the last cell, the END signal mentioned hereinbefore is supplied to the buffer write control circuit 126 from the cell species check circuit 125, whereon the buffer write control circuit 128 performs in succession the processings mentioned below to thereby allow the cell data of one frame to be transferred from the first FIFO to the second FIFO.

(NP) 2nd WA←(1st RA)
2nd WA←(1st WA)
1st RA←0
1st WA←0

Figure 17:
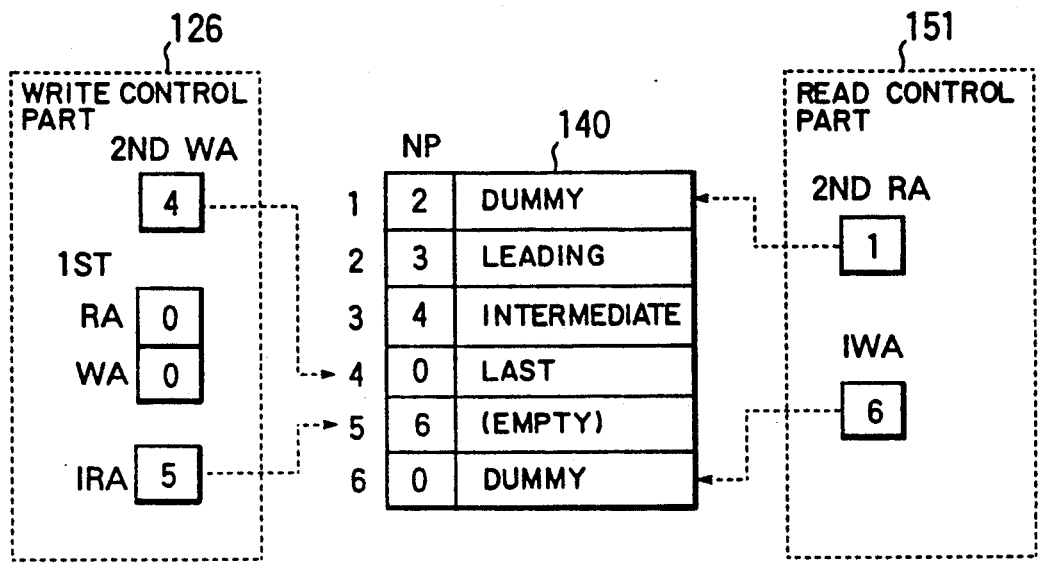
Figure 18:
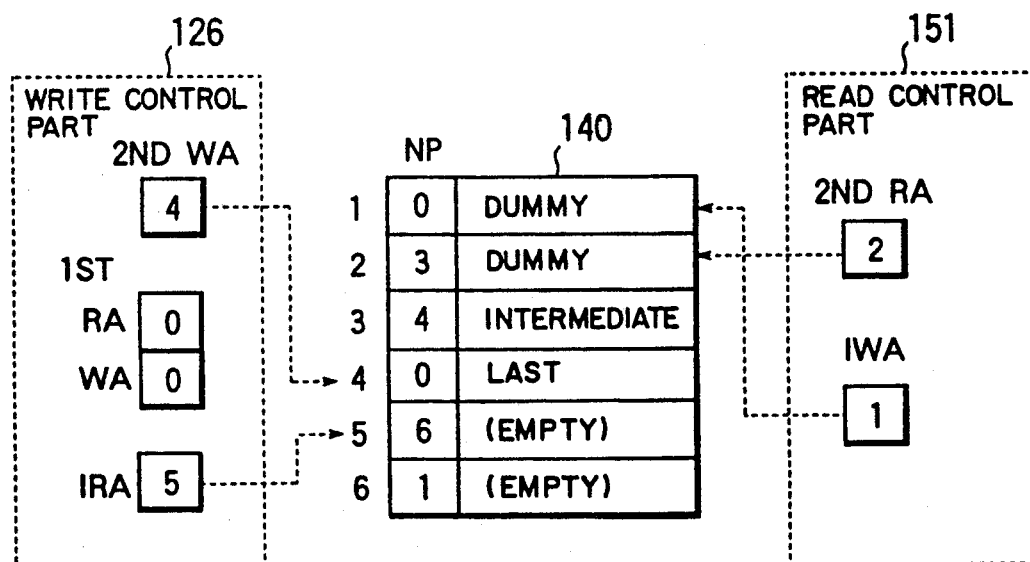

The state attained after execution of the above processings is shown in FIG. 17. Only after the processings described above, the value of the NP of the cell buffer designated by the RA (2nd RA) of the second FIFO is rewritten to a value other than "0". Since the buffer read control circuit 151 periodically checks the value of NP of the cell buffer designated by the 2nd RA, as presumed hereinbefore, the buffer read control circuit 151 ca know that data has been stored in the second FIFO without need for receiving the direct message to this effect from the buffer write control circuit 126. It should however be mentioned that at this time point, a message informing that data has been stored in the second FIFO may be supplied to the buffer read control circuit 151 from the buffer write control circuit 126.

When data has been stored in the second FIFO, the buffer read control circuit 151 executes successively the undermentioned processing to thereby read the cell data from the second FIFO while transferring to the idle FIFO those cell buffers (empty buffers) which have proved unnecessary as the result of reading.

IWA←(2nd RA)
(NP) IWA←0
2nd RA←(NP) 2nd RA
(Read)←(Cell Buffer) 2nd RA

The state attained after the data of the frame leading cell has been read with the relevant cell buffer having been transferred to the idle FIFO through the processings mentioned above is shown in FIG. 18.

As will be appreciated from the foregoing, the buffer read control circuit 151 shown in FIGS. 1 and 6 periodically checks the data (NP) at the address designated by the (n+1) RAs by way of the bus 150. When it is found that the cell data has been stored in the second FIFO (i.e. when the NP has assumed a value other than "0"), the buffer read control circuit 151 reads out the cell data from the relevant buffer and transfers the data to the FIFO 152 (152-1 to 152-n) while updating the value of the RA to the value of the NP as read. However, for the scrapping FIFO, the data in the cell buffer is never read out with the cell buffer in the scrapping FIFO being transferred to the idle FIFO 143. It should however be mentioned that also for the scrapping FIFO, same processings as those for the other second FIFO may be performed by reading out the data of the cell buffer (except that the data read out are scrapped).

Inputted to the buffer read control circuit 151 from the FIFO 152 is a signal "Ready". When the FIFO 152 becomes full with the signal "Ready" being "Not Ready", the buffer read control circuit 151 stops temporarily the data transfer to that FIFO.

When the VCI extracting circuit 153 (representing collectively 153-1 to 153-n) receives the cell of the frame leading cell species and the cell data of the frame equality cell species, the circuit 153 inputs the VCI 520 of that cell to a VCI/DLCI translation table 160. Additionally, the received cell data is transferred to a frame assembling circuit 154 (representing collectively 154-1 to 154-n).

Figure 19:
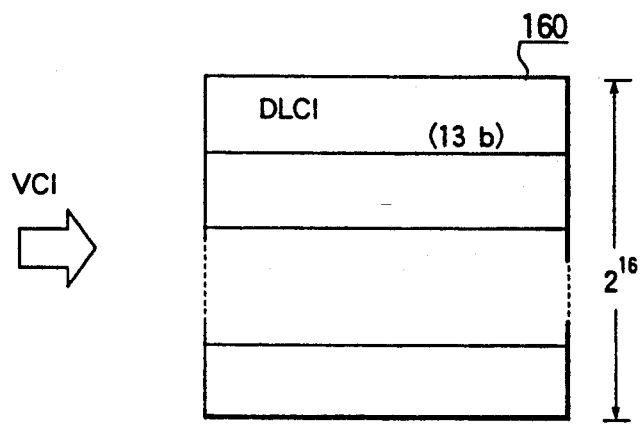
FIG. 19 is a view showing a structure of a VCI/D-LCI translation table (160)

As is shown in FIG. 19, the VCI/DLCI translation table 160 stores the records composed only of the DLCI at the addresses corresponding to the values of the VCIs and is capable of outputting to the DLCI translation circuits 156-i the corresponding DLCIs from the addresses which correspond to the VCLs inputted from VCI extracting circuits 153-i (where $1 \leq i \leq n$). Parenthetically, the contents of the VCI/DLCI translation table 160 are set up by the processor 40 by way of the bus 108, the interface circuit 107 and the bus 104.

The frame assembling circuit 154 (representing collectively the circuits 154-1 to 154-n) serves for assembling the frame 50 shown in FIG. 22B on the basis of the cell species field 540 and the effective information length field 560 shown in FIG. 22B while inserting "0"

bit for flag identification. The frame data thus obtained is supplied to the FCS check circuit 155 (representing collectively the circuits 155-1 to 155-n).

The FCS check circuit 155 performs the FCS check while transferring successively the frame data supplied from the frame assembling circuit 154, wherein upon detection of error, the FCS check circuit 155 outputs an about indication signal to a FCS recomputation circuit 157 (representing collectively the circuits 157-1 to 157-n).

The DLCI translation circuit 156 (representing collectively 156-1 to 156-n) serves to translate the DLCI value inputted from the FCS check circuit 155 to the value of the DLCI inputted from the VCI/DLCI translation table 160. For rewriting the DLCI which constitutes a part of the frame data, it is necessary to compute again the FCS. The processing to this end is performed by a FCS recomputation circuit 157.

The FCS recomputation circuit 157 (representing collectively 157-1 to 157-n) is connected to the LAPD-LSI 101 (101-1 to 101-n) through a signal line 102 constituted by a pair of lines for data reception (R×D) and reception clock (R×C) and performs the FCS computation after the DLCI translation while sending the frame data to the LAPD-LSI. However, when data error takes place in the frame before the DLCI translation, i.e. when an about command is inputted from the FCS check circuit 155, the output of the frame data to the LAPD-LSI is stopped with an abort pattern (consisting of a succession of seven or more "1s") being outputted.

In the foregoing description, it has been assumed that the tables shown in FIGS. 7, 8, 19 and 20 (which will be referred to later on) each contain $2^{16}$ or $2^{13}$ records in order to make possible the processings of $2^{16}$ and $2^{13}$ DLCIs, respectively. It should however be understood that when the numbers of VCIs and DLCIs to be processed are small, the number of the records in the tables mentioned above may be decreased as well.

Figure 21:
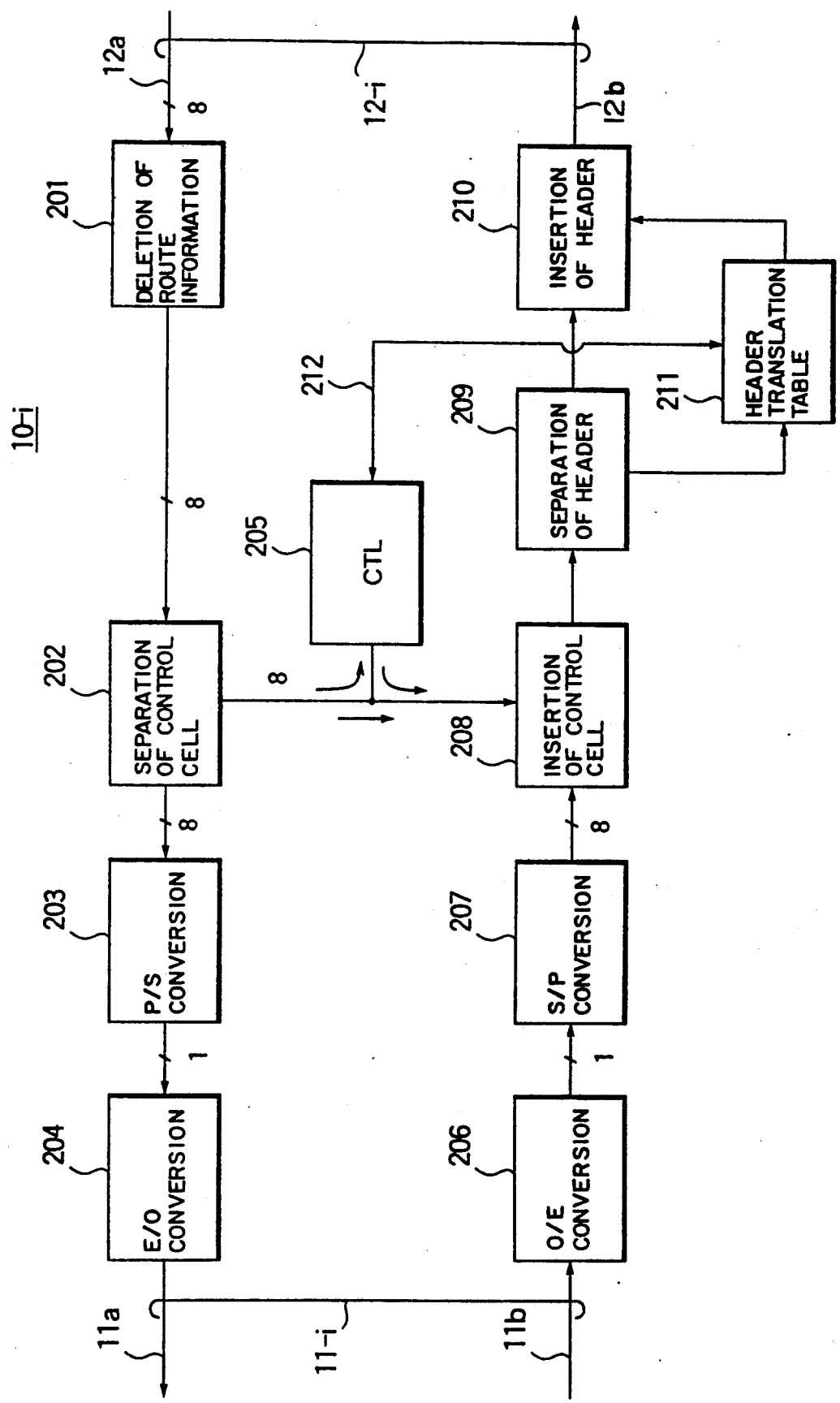
FIG. 21 is a functional block diagram showing a structure of a line interface (LIF)

Next, a structure of the LIF 10-i will be described in detail by reference to FIG. 21.

The LIF 10-i includes a route information detection circuit 201 for deleting the route information 56 affixed to the start of the cell 51 inputted from the ATM switch 30 by way of the transmission bus 12a, a control cell separation circuit 202 for extracting only the control cells from those inputted for thereby transferring the control cells to a CTL 205 or a control cell insertion circuit 208, a parallel-to-serial conversion circuit 203 (P/S converter) for outputting serially the cell data on a bit-by-bit basis, and an electric/optical signal conversion circuit (E/O converter) 204 for converting the abovementioned serial data into optical signals which are then outputted to an optical fiber 11a.

Further, the LIF 10-i includes an optical-electric signal conversion circuit (O/E converter) 206 for converting optical cell signals incoming from subscriber's terminals or other ATM switch via the reception fiber 11b into electric signals, a serial-to-parallel conversion circuit (S/P converter) 207 for converting the serial signal inputted from the O/E converter 206 into parallel data on an eight-bit basis, the control cell insertion circuit 208 for inserting the control cells inputted from the control cell separation circuit 202 or the CTL 205 between the cells received from the line, a header separation circuit 209, a header insertion circuit 210, a header translation table 211 and the CTL 205.

As described hereinbefore, each of the cells sent from a subscriber's terminal is composed of the cell header 52 and the information field 53, as shown in FIG. 22B. The header separation circuit 209 serves to separate the header field part 52 from the cell data to thereby supply the VCI 520' contained in the header field part 52 to the header translation table 211 while supplying the information field 53 to the header insertion circuit 210.

Figure 20:
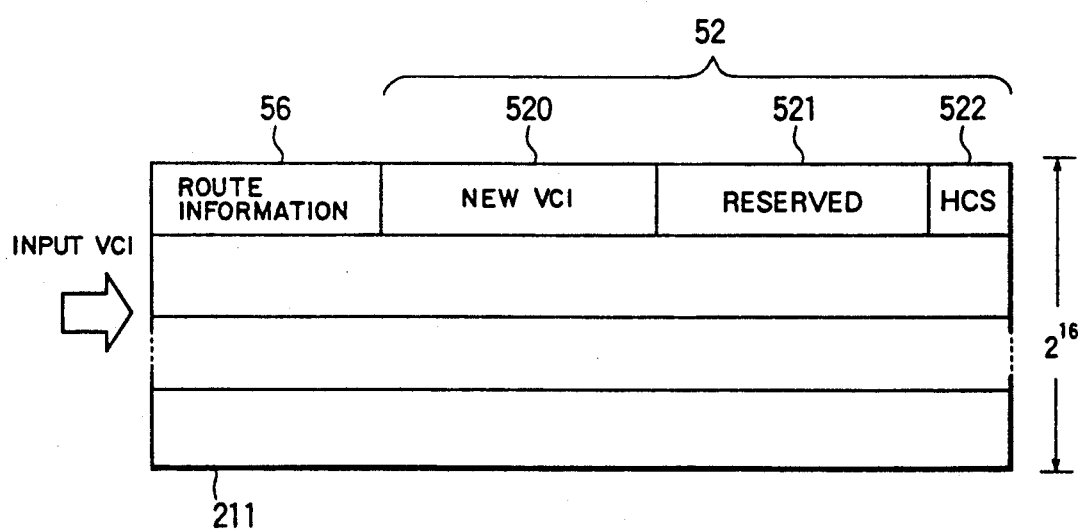
FIG. 20 is a view showing a structure of a header translation table (211)

Referring to FIG. 20, the header translation table 211 stores the records each composed of the route information 56 and the header information 52 containing new VCI 520 at the addresses corresponding to the values of the input VCIs 520' and is adapted to output the record corresponding to the VCI 520' inputted from the header separation circuit 209 to the header insertion circuit 210 by using the VCI 520' as the address. In the header insertion circuit 210, the record read out from the header translation table 211 and composed of the route information 56 and the new header 52 is affixed to the reading end of the information field 53 to be subsequently sent to the ATM switch 30 via the reception bus 12b.

The contents of the header translation table 211 are set up by the processors 40 by using the control cells. More specifically, when the processor 40 issues to the control cell transmission/reception part 103 a command for setting up (writing) a record in the header translation table then the control cell carrying the information for the record arrives at the CTL 205 by way of the bus 109, the ADP processing part 100, the ATM switch 30, the bus 12 and the control cell separation circuit 202, whereon the CTL 205 sets up the content of the header translation table 211 through the bus 212. On the other hand, when the processor 40 issues to the CTL 205 an instruction for reading a record of the header translation table 211 by using the control cell, the CTL 205 sends out the control cell containing the content of the record as designated to the control cell insertion circuit 208. In this way, the control cell is transmitted in the order reverse to that mentioned above, whereby the processor 40 can read the content of the header translation table 211.

Parenthetically, the control cell and the other cells can be discriminated from each other by using a specific bit of the route information 56 for the identification of the control cell or alternatively by dedicating a specific VCI to the control cell.

In the case of the embodiment now under consideration, there is provided the transmission/ reception part 103 dedicated to the control cell. It should however be noted that such an arrangement may equally be adopted in which a circuit for processing the cell format shown in FIG. 22B is incorporated in the LIF 10-i, wherein LAPD protocol or subset thereof is processed by the CTL 205. In this case, the control cell transmission/reception part 103 may be spared with the LIF 10 being controlled through the medium of the LAPD-LSI 101.

When the cells inputted through the optical fiber 11b for reception are those for the signal processing (i.e. for the signal channel), there are set up previously in the header translation table 211 at the addresses corresponding to the VCIs of the input cells, respectively, the route information indicating correspondences between the input cells and the bus 15. After the header translations, the cells are outputted onto the bus 15 by the ATM switch 30 to be subsequently assembled to the frame in the signal processing unit 1, wherein the contents of the information fields are messaged to the processor 40. Parenthetically, the method of imparting the VCI upon header translation mentioned above may be realized by resorting to a method disclosed in The Technical Study Report SSE 89-53 entitled "System Configuration of ATM Switching", section 4. 2: the Institute of Electronic, Information and Communication Engineers of Japan.

The information field mentioned above stores therein the messages such as the numbers of the calling and destination terminals or the like information which are required for the call control. The processor 40 performs the processing of layer 3 (call control) on the basis of message. When there arises, for example, the necessity for transmitting a new signal channel message to other ATM switch as a result of the processing mentioned above, a message send request is issued to the signal processing unit 1, which performs on the message from the processor 40 the processing of layer 2 (frame generating processing and others) and the processing for disassembling the frame to cells (segmentation processing), whereon the cells thus generated are sent to the ATM switch 30 through the bus 15. These cells arrive at the LIF 10 of the trunk line side in accordance with the route information 56 added by the ADP processing part of the signal processing unit 1 to be subsequently sent to the counterpart switch via the trunk line. On the other hand, the message to be sent to the calling subscriber's terminal in response to a message received from the counterpart (destination) switch is supplied to the signal processing unit 1 from the processor 40 to be disassembled to the cells and sent to the subscriber's terminal via the ATM switch 40.

In this manner, the processor 40 performs the call control through the signal channel, wherein the VCI to be affixed to the cell for the information channel is informed to the calling subscriber's terminal as well as the counterpart (destination) switch in terms of the signal channel message sent out from the processor. At the same time, the new record corresponding to the abovementioned VCI is additionally written in the reception management table 130 of the ADP processing part 100, the VCI/DLCI translation table 160, and the header translation table 211 of the LIF 10, so that when the cells of the information channel are inputted from the subscriber's terminal or the destination switch, the input cells can be directly distributed to the line leading to the destination by the ATM switch after having been translated into the header by using the record for translation.

Now, description will be turned to a second embodiment of the present invention by reference to FIGS. 23 to 26.

In the case of the second embodiment of the invention, a cell format illustrated in FIGS. 23A and 23B is presumed. In the cell format (FIGS. 22A and 22B) employed in the first embodiment described in the foregoing, segmentation of the frame into cells is so realized that the content covering the address field to the FCS field of each frame except for the frame start flag and the frame end flag are included in the information field 53 of the cell. In contrast, according to the second embodiment of the invention, the FCS field of each frame is excluded from the processing for segmentation into cells. Instead, there are provided in the ADP header 54' a cell species field 540, a SN (Sequence Number) of 4 bits used for detecting the loss of the cell and a reserve field 543 of 10 bits.

In the second embodiment of the invention, the transmission system 100A of the ADP processing part is implemented in the structure shown in FIG. 4, as in the case of the first embodiment. However, the frame detection circuit 111 is s configured that the frame data covering the address field to the information field except for the FCS is converted to parallel data of 8 bits after having deleted the bit "0" for flag identification, the parallel data being then sent to the counter part 112 (112-1 to 112-n). Further, the ADP header trailer adding circuit 114 is so arranged as to first compute the SN 541, whose value is set up such that it assumes necessarily "0" in the frame leading cell or in the frame equality cell, while in the intermediate cells or the last cell the value is increased progressively in the order of 1, 2, 3, . . ., 14, 15, 0, 1 and so forth. The ADP header trailer add circuit 114 then generates the ADP header 54' of the format shown in FIG. 23B, whereon the data of the information field part 53 are transferred to the transmission header adding circuit 115 in the order of the ADP header 54', the data in the FIFO 113 and the effective information length 560. Finally, the CCS 561 determined arithmetically in parallel with the abovementioned transfer processing is transferred, whereupon the transfer processing of the information field 53 of one cell is completed.

Figure 24:
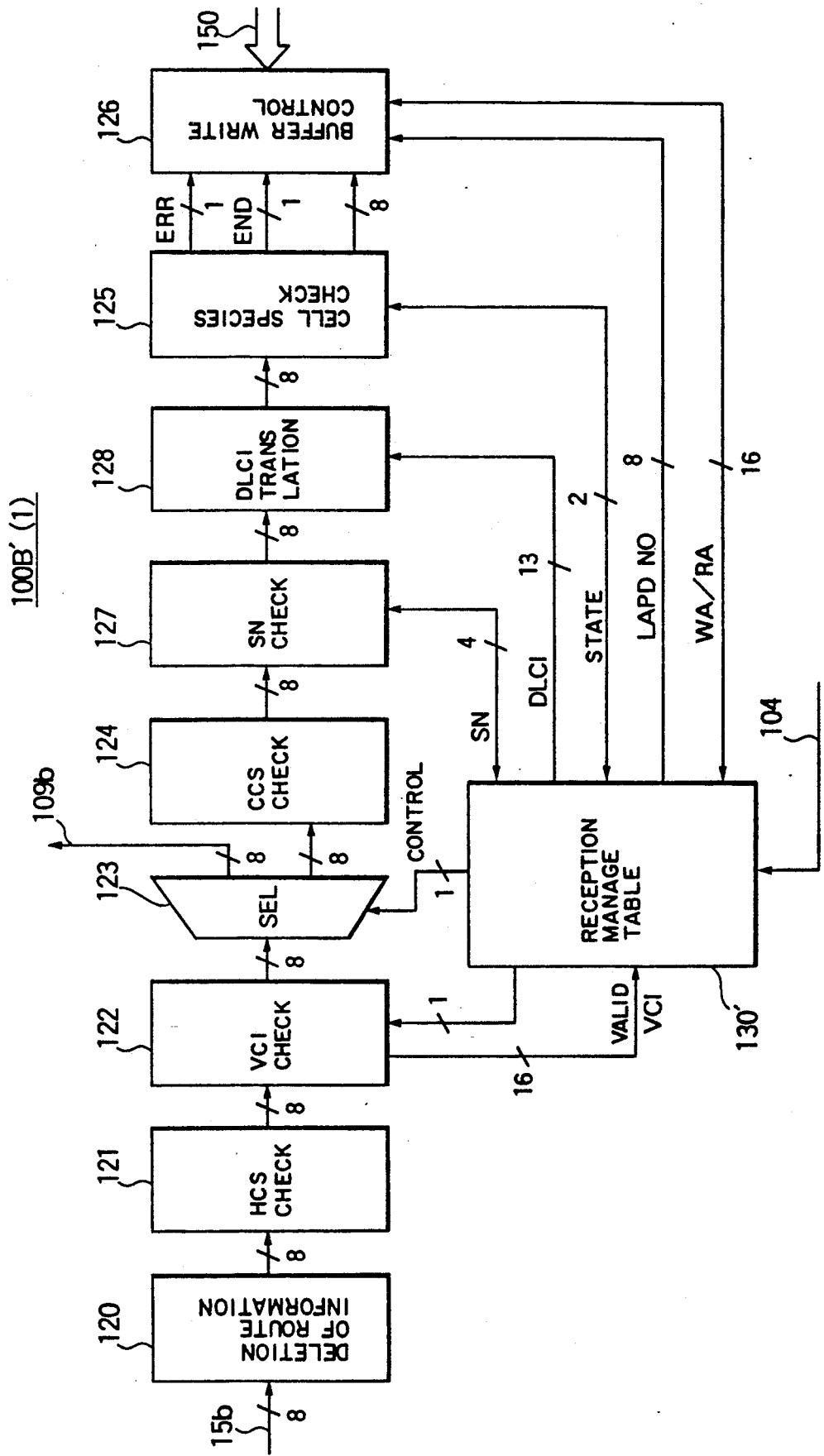
FIG. 24 is a functional block diagram showing a receiving system according to another embodiment of the invention which can be employed in place of the transmitting system shown in FIG. 6.
Figure 25:
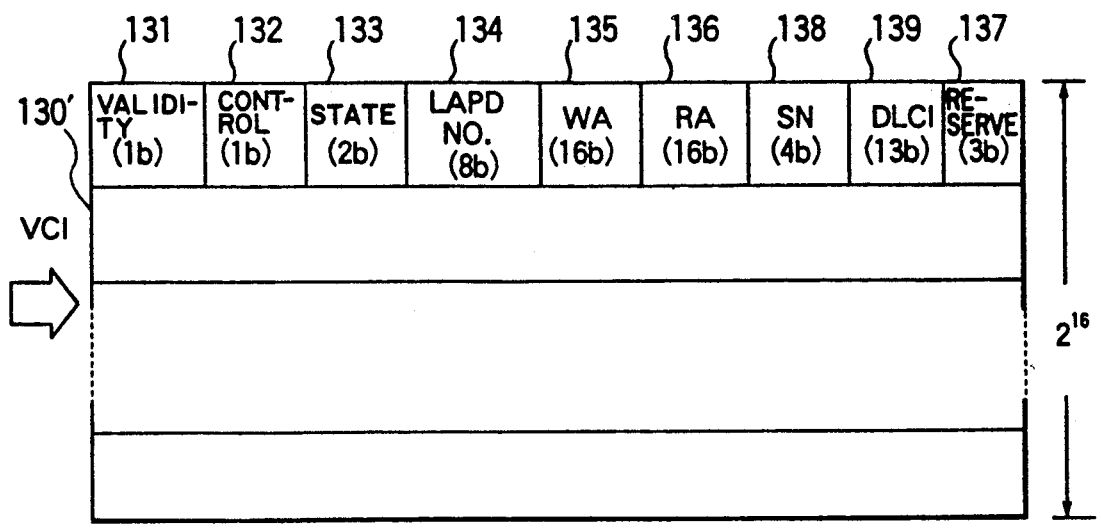
FIG. 25 is a view showing a reception management table (130') employed in the receiving system shown in FIG. 24.

Next, description will be made of the receiving system by reference to FIGS. 24 to 26. The receiving system 100B' according to the second embodiment differs from that of the firs embodiment in the following respects.

(1) The FCS processing is modified because of the modification of the cell format with the SN processing being added.

(2) The DLCI modification processing is simplified.

In the case of the first embodiment, the receiving system has to perform retrieval for the two tables 130 and 160. However, in the case of the second embodiment, the table retrieval may be performed only once. Now, referring to FIG. 25, the reception management table 130' which is accessed with the address corresponding to the VCI outputted from the VCI check circuit shown in FIG. 24 stores at the address corresponding to the value of the input VCI a record composed of a validity indication 131 of 1 bit, a control cell indication 132 of 1 bit, a reassembly state 133 of 2 bits, a LAPD No. 134 of 8 bits, a WA (Write Address) 135 of a first FIFO described hereinafter, a RA (Read Address) 136 of the first FIFO, an expected SN value 138 of 4 bits, DLCI 139 of 13 bits and a reserve 137 of 3 bits. The content of the abovementioned table is read out with the aid of the VCI inputted from the VCI check circuit 122 being used as the address, whereby the values of the individual fields are supplied to the VCI check circuit 122, the SEL 123, a SN check circuit 127, the DLCI translation circuit 128, the cell species check circuit 125 and the buffer write control circuit 126, respectively. Further, the fields of the reassembly state 133, the WA 135, the RA 136 and the expected SN value 138 can be written (updating) reversely from the circuits to which these data are destined to be outputted.

The SN check circuit 127 compares the SN field part 542 of the cell data inputted from the CCS check circuit 124 with the expected SN value 137 inputted from the reception management table 130', wherein upon detection of non-coincidence, the cell data is scrapped. On the other hand, when coincidence is found, the cell data is sent to the DLCI translation circuit 128. Subsequently, the expected SN value 138 in the reception management table 130' is updated. Assuming, for example, that the received cell is an intermediate cell with the SN thereof being "2" which coincides with the expected SN value, the latter is then updated to "3". When the received cell is the frame trailing cell on the last cell, the expected SN value is updated to "0".

When the received cell is the frame leading cell or the frame equality cell, the DLCI translation circuit 128 translates the address field (DLCI) of the frame stored in the payload part 55 of that cell into the DLCI value 139 inputted from the reception management table 130'.

Figure 26:
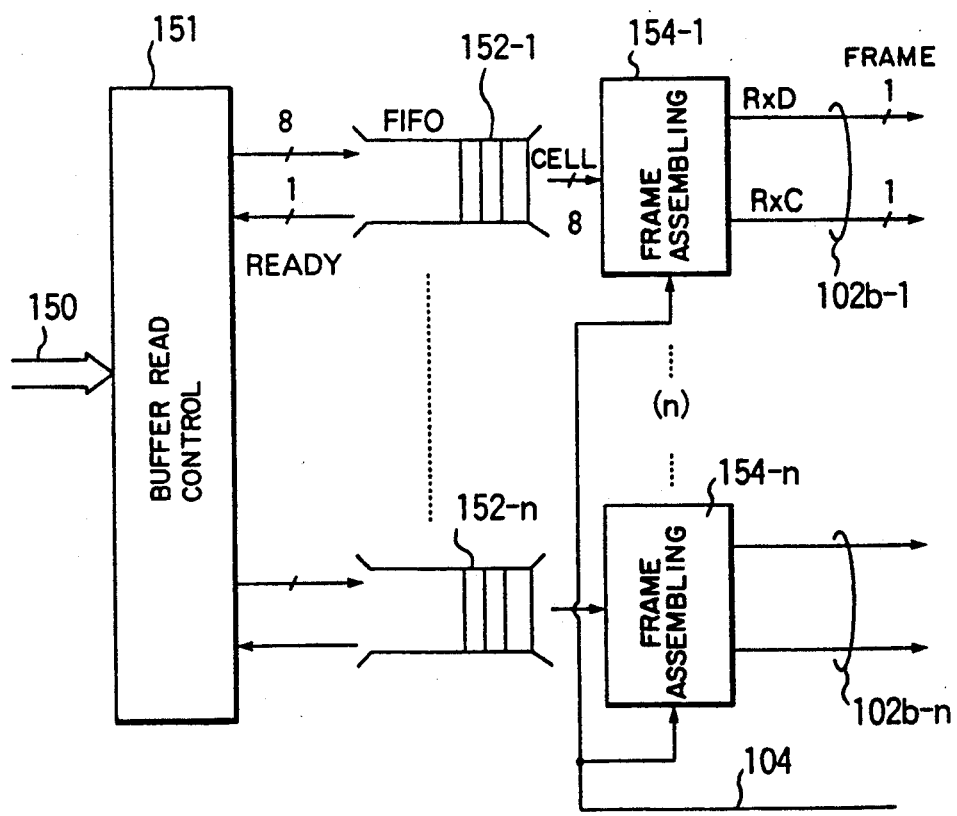
FIG. 26 is a schematic circuit diagram showing a major portion of the receiving system shown in FIG. 24.

On the other hand, the frame assembling circuit 154 (154-1 to 154-n) is connected to the LAPD-LSI 101 (101-1 to 101-n) via a signal line 102b (102b-1 to 102b-n) composed by two lines for received data (R×D) and for receiving clock (R×C), as is shown in FIG. 26, and serves for insertion of bit of "0" for the flag identification and generation of the FCS on the basis of data of the cell species field 540 and the effective information length field 560 shown in FIG. 23B, to thereby assembly the frame 50 (FIG. 23B), the data of which is then sent out to the LAPD-LSI.

It should be mentioned that when the frames are supplied to the LAPD-LSI 101 consecutively from the frame assembling circuit 154, there may occur error such as overrun of the LAPD-LSI due to insufficient processing capability of the latter, thereby impeding the normal reception of the frames. With a view to prevent occurrence of such undesirable situation, the frame assembling circuit 154 is imparted with a function of setting up or inserting arbitrarily a time span or a number of flags between the adjacent frames to be sent out, wherein the time span or the flag number is designated by the processor 40 via the bus 104.

As will be understood from the above description, one feature characterizing the present invention can be seen in that the transition of the VCI is performed in the LIF 10 with the VCI/DLCI translation being effected in the ADP processing part 100 as well, whereby the identification of the signal channels of the subscriber's lines and the trunk lines can be realized with a smaller number of LAPD-LSIs than that of the lines.

Another feature characteristic of the present invention resides in that owing to the VCI/VCI translation and a VCI/DLCI translation described previously, the processing for the signal channels of the subscriber's lines and the trunk or junction lines may be assigned to any given LAPD-LSI, whereby loads of the LAPD-LSIs can be distributed uniformly. Parenthetically, since the number of connections capable of being identified discriminatively by the single LAPD-LSI is $2^{13}$, it is possible to identify with n (number of the LAPD-LSIs) equal to "8" the ATM connections in a number ($2^{16} = 2^{13} \times 8$) corresponding to the number of all bits of the VCLs. Of course, where the processing capability of the LAPD-LSIs as a whole is insufficient, n may be selected greater than "8".

When the VCI of the cell for transmission and reception bears an especial relation to the DLCI of the frame, as exemplified by the VCI of 16 bits of which three more significant bits constitute the LAPD No. With thirteen less significant bits constituting the DLCI, it is possible to delete the fields of the DLCI and VCI from the tables shown in FIG. 7 and 8 by providing circuits for computing them, to thereby reduce the sizes of these tables.

In the illustrated embodiment described above, the ADP processing part 100 is so configured as to have the memory 140 dedicated for the reassembling processing. However, this memory 140 may be spared with the reassembling processing being performed by using the memory 160. Further, by adopting such arrangement that the LAPD-LSI performs the processing for assembling the frame 50 on the memory 160, it is possible to make it unnecessary to serialize the frame data for transmission. Besides, the first FIFO or second FIFO may be implemented as hardware FIFO similarly to the FIFO 152 or FIFO 113.

In the illustrated embodiments of the invention, the transmitting system 100A of the ADP processing part is so arranged as to include the circuit for executing the segmentation processing for each of the LAPD-LSIs. However, by providing a circuit for multiplexing the frame in precedence to the segmentation processing, the number of the segmentation processing circuits can be decreased.

Figure 22:
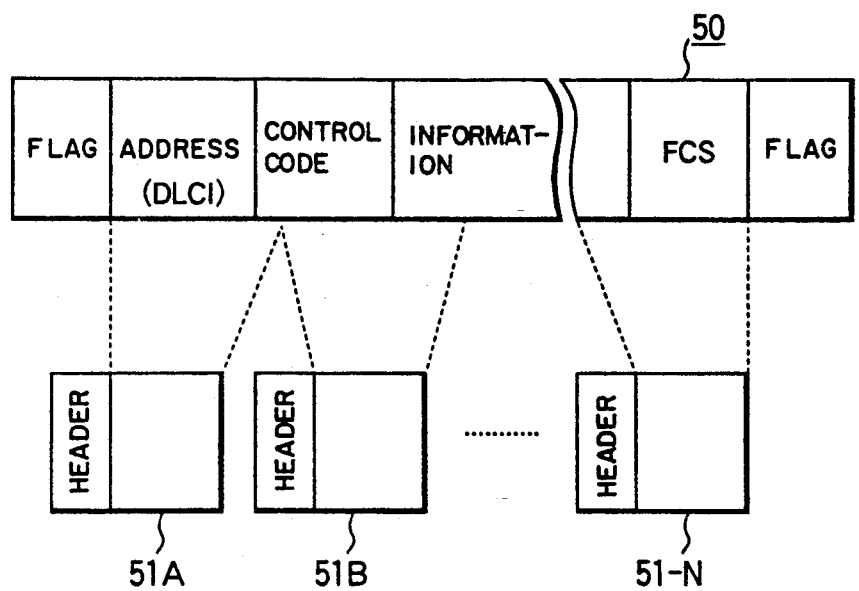
FIGS. 22A and 22B are views showing examples of a frame format and a cell format, respectively.
Figure 22:
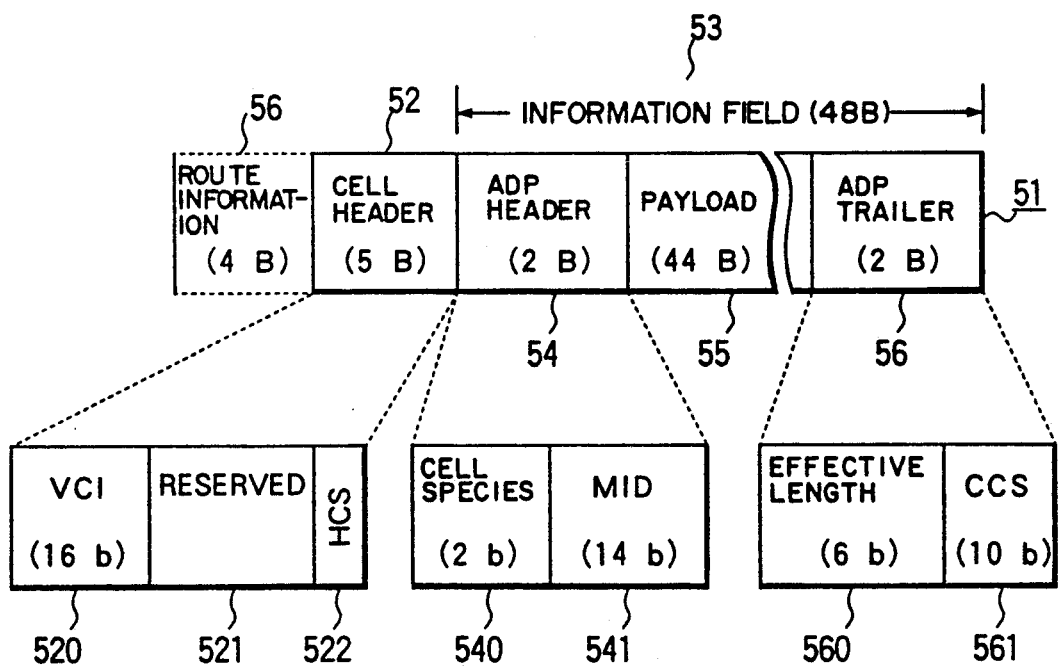
Figure 23:
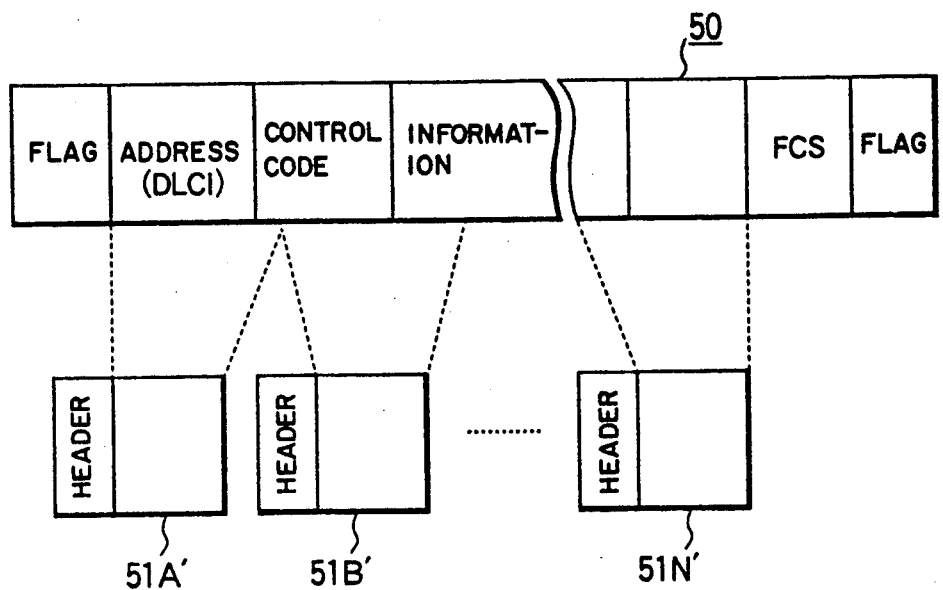
FIGS. 23A and 23B are views showing further examples of the frame format and the cell format to which the present invention can be applied.
Figure 23:
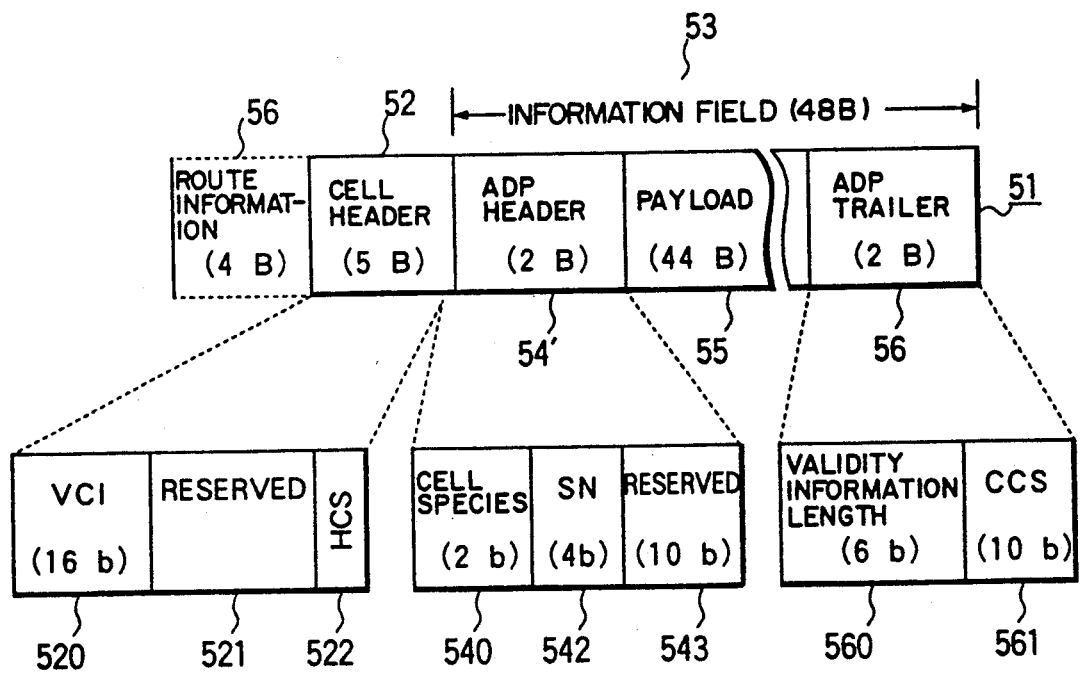

Furthermore, the structure of the ADP processor of the signal processing part int he ATM switch system disclosed in conjunction with the embodiments of the invention may be applied to the subscriber's terminal or frame processing of the information channel. In the foregoing description, it has been assumed that the MID field 541 shown in FIG. 22 is not used. However, by replacing the processing of the VCIs in the ADP processing part all by the processing for the MID, the structure of the ADP processing part may be adopted in the connectionless communication in which the MID is used. In that case, the first FIFO 141 shown in FIG. 1 will be constituted by $2^{14}$ elementary FIFOs for each of the MIDs.

As will now be appreciated form the foregoing, according to the present invention which teaches that the reassembling FIFOs incorporated in the ADP processing part is divided into first FIFOs, second FIFOs and an idle FIFO, wherein the second FIFOs is constituted by a plurality of elementary FIFOs corresponding to LAPD-LSIs, respectively, and a scrapping FIFO, the ADP processings for a plurality of LAPD-LSIs can be executed simultaneously, while the regeneration of the cell buffer upon error detection can be much facilitated, to advantageous effect.

We claim:

1. An adaptation processing apparatus for assembling received data units of a fixed length to form data units of a variable length and transmitting the variable length data units to a plurality of high-rank devices respectively for processing the variable length data units, comprising:

a memory which is partitioned into a plurality of buffers, each buffer having a capacity for storing a fixed length data unit, to provide first, second and third first-in-first-out (FIFO) storages;

the first storages, provided for every identifier of the fixed length data units, each first FIFO storage including means for storing fixed length data units of corresponding identifiers transmitted through a line, a plurality of fixed length data units stored in a first FIFO storage comprise a variable length data unit;

the second FIFO storages, provided for every high-rank device, each second FIFO storage including means for storing the variable length data unit stored in said first FIFO storage and sending the stored variable length data unit to a corresponding one of the high-rank devices; and the third FIFO storage for storing an empty buffer, wherein when data stored in one of said second FIFO storages is read, the buffer of the one of said second FIFO storages is stored in said third FIFO storage as the empty buffer.

2. The adaptation processing apparatus according to claim 1, further comprising:

a fourth FIFO storage obtained by partitioning the memory into the plurality of the buffers each having the capacity of the fixed length data unit, wherein when data stored in one of said first FIFO storages includes error data, said fourth FIFO storage stores all data stored in the one of said first FIFO storages, and wherein when the data stored in said fourth FIFO storage is read, the buffer of said fourth FIFO storage is stored in said third FIFO storage as the empty buffer.

3. The adaptation processing apparatus according to claim 1, wherein said buffers are linked by pointers to form said first to third FIFO storages and data transfer among said first to third FIFO storages is performed by controlling said pointers.

4. The adaptation processing apparatus according to claim 10, further comprising:

means for measuring a resident time of the fixed length data units stored in each of said first FIFO storages and scrapping the fixed length data unit stored for a time exceeding a predetermined duration.

5. The adaptation processing apparatus according to claim 1, further comprising:

means for measuring a number of fixed length data units stored in each of said first FIFO storages and scrapping the fixed length data units stored in said first FIFO storage when the measured number exceeds a predetermined value.

6. The adaptation processing apparatus according to claim 1, further comprising:

means for arbitrarily setting a time period between the variable length data units sequentially sent from each of said second FIFO storages to the corresponding high-rank device.

7. An adaptation processing apparatus for assembling received data units of a fixed length to form data units of a variable length and transmitting the variable length data units to a plurality of high-rank devices respectively for processing the variable length data units, comprising:

a memory which is partitioned into a plurality of buffers, each buffer having a capacity for storing a fixed length data unit to provide first, second and third storage units;

the first storage units, provided for every identifier of the fixed length data units, each first storage unit including means for storing fixed length data units of corresponding identifiers transmitted through a line, a plurality of fixed length data units stored in a first storage unit comprise a variable length data unit;

the second storage units, provided for every high-rank device, each second storage unit including means for storing the variable length data unit stored in said first storage unit and sending the stored variable length data unit to a corresponding one of the high-rank devices; and the third storage unit for storing an empty buffer, wherein when data stored in one of said second storage units is read, the buffer of the one of said second storage units is stored in said third storage unit as the empty buffer.

8. The adaptation processing apparatus according to claim 7, further comprising:

a fourth storage unit obtained by partitioning the memory into the plurality of the buffers each having the capacity of the fixed length data unit, wherein when data stored in one of said first storage units includes error data, said fourth storage unit stores all data stored in the one of said first storage units, and wherein when the data stored in said fourth storage unit is read, the buffer of said fourth storage unit is stored in said third storage unit as the empty buffer.

9. An adaptation processing apparatus for assembling received data units of a fixed length to form data units of a variable length and transmitting the variable length data units to a plurality of high-rank devices respectively for processing the variable length data units, comprising:

a memory which is partitioned into a plurality of buffers, each buffer having a capacity for storing a fixed length data unit to provide first, second and third first-in-first-out (FIFO) storages;

the first FIFO storages, provided for every identifier of the fixed length data units, each first FIFO storage including means for storing the fixed length data units of corresponding identifiers, a plurality of fixed length data units stored in a first FIFO storage comprise a variable length data unit;

means for receiving the fixed length data unit transmitted through a line and storing the received fixed length data unit into the first FIFO storage of a corresponding identifier, the first FIFO storage storing the variable length data unit;

the second FIFO storage being provided for every high-rank device;

means for transferring the variable length data unit stored in said first FIFO storage to said second FIFO storage;

means for sending the variable length data unit transferred to said second FIFO storage to a corresponding one of the high-rank device; and the third FIFO storage for storing an empty buffer, wherein when data stored in one of said second FIFO storages is read, the buffer of the one of said second FIFO storages is stored in said third FIFO storage as the empty buffer.

10. The adaptation processing apparatus according to claim 9, further comprising:

a fourth FIFO storage obtained by partitioning the memory into the plurality of the buffers, each buffers having the capacity of the fixed length data unit;

means for, when data stored in one of said first FIFO storages includes error data, storing all data stored in the one of said first FIFO storages into said fourth FIFO storage, wherein when the data stored in said fourth FIFO storage is read, the buffer of said fourth FIFO storage is stored in said third FIFO storage as the empty buffer.

11. The adaptation processing apparatus according to claim 9, wherein said means for transferring includes means for transferring a table defining relations between the identifiers and the high-rank devices, and means for transferring the variable length data unit stored in said first FIFO storage to said second FIFO storage with reference to said table.

12. An adaptation processing apparatus for assembling received data units of a fixed length to form data units of a variable length and transmitting the variable length data units to a plurality of high-rank devices respectively for processing the variable length data units, comprising:
- a memory which is partitioned into a plurality of buffers, each buffer having a capacity for storing a fixed length data unit to provide first, second and third first-in-first-out (FIFO) storages;
- the first FIFO storages, provided for every identifier of the fixed length data units, each first FIFO storage including means for storing the fixed length data units of corresponding identifiers, a plurality of fixed length data units stored in a first FIFO storage comprise a variable length data unit;
- means for receiving each fixed length data unit transmitted through a line and storing the received fixed length data unit into the first FIFO storage in accordance with a corresponding identifier;
- the second FIFO storages being provided for every high-rank device;
- means for transferring the buffer of one of said first FIFO storages to said second FIFO storage when the variable length data unit is stored in the one of said first FIFO storages;
- means for sending the variable length data unit of the buffer transferred to said second FIFO storage to a corresponding one of the high-rank device; and
- the third FIFO storage for storing an empty buffer, wherein when data stored in one of said second FIFO storages is read, the buffer of the one of said second FIFO storages is stored in said third FIFO storage as the empty buffer, and wherein the empty buffer of said third FIFO storage is transferred to said second FIFO storage when said means for receiving receives a fixed length data unit.

13. The adaptation processing apparatus according to claim 12, further comprising:
- a fourth FIFO storage obtained by partitioning the memory into the plurality of the buffers each having the capacity of the fixed length data unit;
- means for, when data stored in one of said first FIFO storages includes error data, storing all data stored in the one of said first FIFO storages into said fourth FIFO storage, wherein
- when the data stored in said fourth FIFO storage is read, the buffer of said fourth FIFO storage is stored in said third FIFO storage as the empty buffer.

14. The adaptation processing apparatus according to claim 12, wherein said buffers are linked by pointers to form said first to third FIFO storages and buffer transfer among said first to third FIFO storages is performed by controlling said pointers.

15. A broadband communication system comprising:
- interface means for communicating a data unit of a fixed length through a transmission line;
- an asynchronous transfer mode switching means operatively connected to said interface means for communicating the fixed length data unit therewith; and
- an adaptation processing apparatus for receiving the fixed length data unit from said asynchronous transfer mode switching means, said adaptation processing apparatus comprising
- a memory which is partitioned into a plurality of buffers, each buffer having a capacity for storing a fixed length data unit, to provide first, second and third first-in-first-out (FIFO) storages;
- the first FIFO storages, provided for every identifier of the fixed length data units, each first FIFO storage including means for storing fixed length data units of corresponding identifiers transmitted through a line, a plurality of fixed length data units stored in a first FIFO storage comprise a variable length data unit;
- the second FIFO storages, provided for every high-rank device, each second FIFO storage including means for storing the variable length data unit stored in said FIFO storage and sending the stored variable length data unit to a corresponding one of the high-rank devices; and,
- the third FIFO storage for storing an empty buffer, wherein when data stored in one of said second FIFO storages is read, the buffer of the one of said second FIFO storages is stored in said third FIFO storage as the empty buffer.

16. The broadband communication system according to claim 15, further comprising:
- a fourth FIFO storage obtained by partitioning the memory into the plurality of the buffers each having the capacity of the fixed length data unit, wherein
- when data stored in one of said first FIFO storages includes error data, said fourth FIFO storage stores all data stored in the one of said first FIFO storages, and wherein
- when the data stored in said fourth FIFO storage is read, the buffer of said fourth FIFO storage is stored in said third FIFO storage as the empty buffer.

17. The broadband communication system according to claim 15, wherein said buffers are linked by pointers to form said first to third FIFO storages and data transfer among said first to third FIFO storages is performed by controlling said pointers.

18. The broadband communication system according to claim 15, further comprising:
- means for measuring a resident time of the fixed length data units stored in each of said first FIFO storages and scrapping the fixed length data unit stored for a time exceeding a predetermined duration.

19. The broadband communication system according to claim 15, further comprising:
- means for measuring a number of fixed length data units stored in each of said first FIFO storages and scrapping the fixed length data units stored in said first FIFO storage when the measured number exceeds a predetermined value.

20. The broadband communication system according to claim 15, further comprising:
- means for arbitrarily setting a time period between the variable length data units sequentially sent from each of said second FIFO storages to the corresponding high-rank device.

21. The broadband communication system according to claim 15, further comprising:
means for detecting whether or not the fixed length data unit received from said asynchronous transfer mode switching means includes a control cell for use in said broadband communication system; and
means for, when the control cell is detected in the received fixed length data unit, sending the detected control cell to means for processing the control cell.

22. The broadband communication system according to claim 21, wherein the control cell includes information such as setting and disuse of a root.

* * * * *

UNITED STATES PATENT AND TRADEMARK OFFICE
CERTIFICATE OF CORRECTION

PATENT NO. : 5,214,642

DATED : May 25, 1993

INVENTOR(S) : Masao Kunimoto, et al.

It is certified that error appears in the above-identified patent and that said Letters Patent is hereby corrected as shown below:

Claim 9, column 22, line 42, delete "storage" and substitute therefor --storages--.

Claim 12, column 23, line 36, delete "device" and substitute therefor --devices--.

Claim 15, column 24, line 21, before "FIFO" insert --first--.

Signed and Sealed this

Eighteenth Day of January, 1994

Attest:

BRUCE LEHMAN

*Attesting Officer*     *Commissioner of Patents and Trademarks*